United States Patent
Osborn et al.

(10) Patent No.: US 12,212,699 B2
(45) Date of Patent: Jan. 28, 2025

(54) SYSTEMS AND METHODS FOR CONDITIONAL DISTRIBUTION OF AGGREGATED CRYPTOGRAPHIC DATA BASED ON A TRIGGER

(71) Applicant: Capital One Services, LLC, McLean, VA (US)

(72) Inventors: Kevin Osborn, Newton Highlands, MA (US); Jeffrey Rule, Chevy Chase, MD (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 225 days.

(21) Appl. No.: 18/048,389

(22) Filed: Oct. 20, 2022

(65) Prior Publication Data

US 2024/0137230 A1 Apr. 25, 2024
US 2024/0235859 A9 Jul. 11, 2024

(51) Int. Cl.
*H04L 9/00* (2022.01)
*H04L 9/32* (2006.01)

(52) U.S. Cl.
CPC ............... *H04L 9/50* (2022.05); *H04L 9/00* (2013.01); *H04L 9/3213* (2013.01); *H04L 9/3247* (2013.01)

(58) Field of Classification Search
CPC . H04L 9/00; H04L 9/32; H04L 9/3213; H04L 9/3247; H04L 9/50
See application file for complete search history.

(56) References Cited

U.S. PATENT DOCUMENTS

| | | | |
|---|---|---|---|
| 2020/0286133 A1* | 9/2020 | Kurian | G06Q 20/02 |
| 2023/0106751 A1* | 4/2023 | Wainstein | G06Q 30/0619 705/7.34 |

FOREIGN PATENT DOCUMENTS

| | | | | |
|---|---|---|---|---|
| KR | 2021023363 A | * | 3/2021 | |
| WO | WO-2023028462 A1 | * | 3/2023 | G06F 21/6245 |

OTHER PUBLICATIONS

"Managing Charity 4.0 with Blockchain: a Case Study at the Time of Covid-19"—Rangone et al., NIH, NLM, NCBI, Mar. 3, 2021 https://www.ncbi.nlm.nih.gov/pmc/articles/PMC7925260/ (Year: 2021).*

"Crypto Philanthropy: Key Data and Statistics (2021)"—The Giving Back, Dec. 2, 2021 https://thegivingblock.com/resources/crypto-philanthropy-key-data-and-statistics-2021/ (Year: 2021).*

* cited by examiner

*Primary Examiner* — Randy A Scott
(74) *Attorney, Agent, or Firm* — Foley & Lardner LLP

(57) ABSTRACT

System and methods for handling on-chain cryptographic resources based on conditions generated responsive to an off-chain trigger. The system may receive a transfer request that includes a resource allocation request, generate a first blockchain function request for a list of contributor identifiers and condition sets, receive the list of contributor identifiers and condition sets, determine a subset of the list of contributor identifiers and condition sets, generate a second blockchain function request, and transmit the second operation request to a blockchain node.

20 Claims, 7 Drawing Sheets

| Transfer Request 202 | |
|---|---|
| Cryptographic Signature 204 | r=0xb83380f6e1d09411ebf49afd1a95c738686bfb2b0fe2391134f4ae3d6d77b78a, s=0x6c305afcac930a3ea1721c04d8a1a979016baae01131974632a3756fbaee1811 |
| Cryptographic Token Identifier 206 | 49214 |

| Resource Allocation Request 208 | | | | | |
|---|---|---|---|---|---|
| Event Date 210 | Event Classification 212 | Requested Resources 214 | Cryptowallet Address 216 | Additional Information 218 |
| 09/25/2025 | Hurricane | 80.00 ETH | 1F1tAaz5x1HUXrCNLbtMDqcw6o5GNn4xqX | Hurricane Zeta is damaging power lines on several islands in the Caribbean. |

FIG. 2

List of Contributor Identifiers and Condition Sets
300                                                     302

| Contributor Identifiers 304 | Condition Sets 306 | | |
|---|---|---|---|
| | Trigger Class 308 | Trigger Date 310 | Maximum Annual Contribution 312 |
| 0x32acA538E5476114b5cc82c400aa44569eFb4459 | Hurricane | 12/25/2029 or earlier | 10 ETH |
| 0xBC09E4288d64f5fa65a990a04ef5F2397eEb14cB | Earthquake | 08/18/2025 or earlier | 70 ETH |
| 0x9e964488636D3a2752De083276b35536D58c5EdDb | Natural Disaster | 07/23/2024 or later | 120 ETH |

FIG. 3

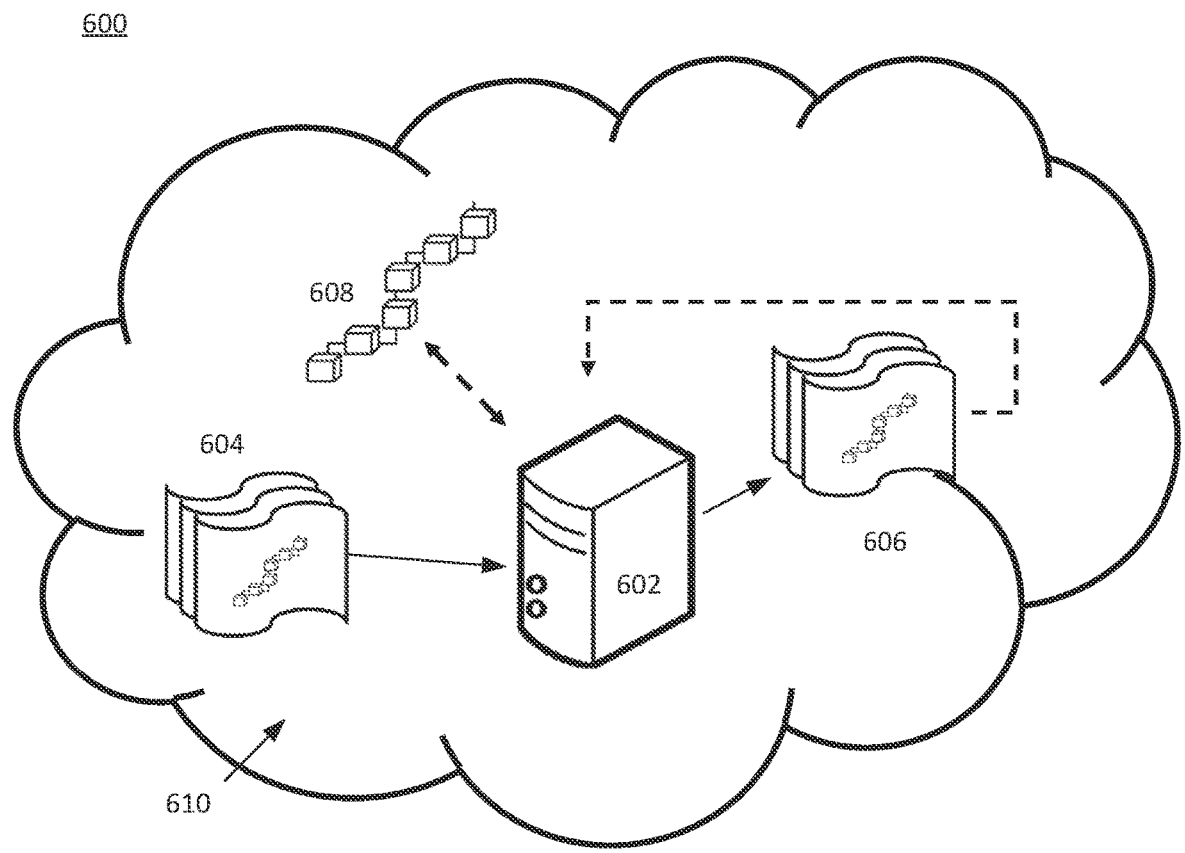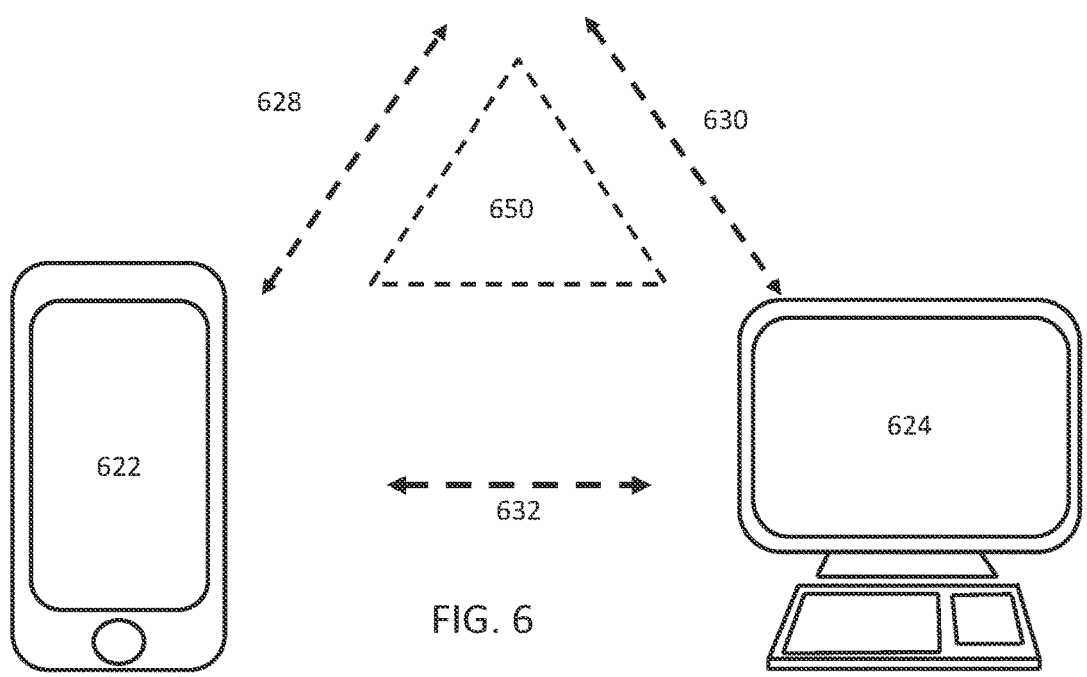
FIG. 6

SYSTEMS AND METHODS FOR CONDITIONAL DISTRIBUTION OF AGGREGATED CRYPTOGRAPHIC DATA BASED ON A TRIGGER

BACKGROUND

As issues such as infectious diseases, climate change and resource scarcity become more prevalent, it has become more important to consider how to mitigate and solve these issues quickly. Currently, for example, allocation of physical resources is logistically challenging in situations where transportation or trade routes may be hindered by natural disasters, civil strife or violence. Distribution of resources during these crises may be difficult and impossible in some situations, which means that communities may not receive the aid they need until it is much too late. Additionally, it is difficult for contributors of resources, such as donors, to know exactly how to distribute resources in an effective way. For example, during a hurricane affecting a region in the Caribbean, contributors may not know which charitable entities, such as which branches of Red Cross, may require resources, and which resources. It is not trivial to determine how to distribute resources in an effective and efficient manner, especially during a dynamic situation, such as a natural disaster. Additionally, resources that require transport may not be able to arrive under difficult weather conditions, which precludes any distribution of physical resources to areas in need during the worst of a natural disaster. Digital resources may be easier to distribute or allocate during a disaster. However, it is still difficult to automatically help those in need while also ensuring that requestors of aid are trustworthy or not fraudulent, as well as determining how to distribute available resources efficiently and to the proper entities. Carrying out checks and balances to ensure that resources are not misused or fraudulently requested may take time and delay any distribution of aid, to potentially disastrous consequences.

SUMMARY

Methods and systems are described herein for distributing aggregated cryptographic resources contributed by multiple users on a blockchain, through an on-chain program, to entities (e.g., entities that respond to natural disasters such as Red Cross) that request those digital resources. The requests may be generated and transmitted based on the occurrence of a trigger. The system may accomplish this by receiving a request for cryptographic resources upon the occurrence of a trigger, verifying the entity requesting these resources, and determining whether contributors' conditions for providing those resources are consistent with the request. Only upon this determination the system may validate the request and send this information for further processing by the on-chain program (e.g., distributing the cryptographic resources). In conventional systems, any contributors who would like to share resources with an entity may specify the given entity, which may not be readily known. Entities themselves are often not able to cast a wide-reaching request to contributors for resources that are needed. By pooling contributed cryptographic resources and distributing them according to pre-determined conditions to requesting entities, the methods and system disclosed herein match contributors with entities that are seeking these resources, which enables automatic, immediate resource sharing when requested by the entity. For example, the system may enable multiple users, such as resource providers, to provide cryptographic resource to be controlled by an on-chain program, while tagging these resources with conditions for when sharing may occur (e.g., enabling sharing only for particular types of natural disasters). A previously verified entity may then request those resources from a resource pool in response to a natural disaster. In response to verifying the entity and, in some embodiments, the occurrence of the natural disaster, the system may enable the entity to receive cryptographic resources only from contributors whose conditions are satisfied by the request. By doing so, digital resource contributors may ensure that their resources are distributed to trusted entities.

The system may achieve this benefit by receiving a transfer request for resources from an entity. That is, the system may receive, from a device associated with an entity, a transfer request. The transfer request may include a digital signature associated with the entity, a cryptographic token identifier, and a resource allocation request. For example, the system may receive a request from a charity operating on an island in the Caribbean for digital resources. The request may include a digital signature associated with the charity's cryptography-based storage application address (e.g., an associated private key), as well as a cryptographic token previously conferred to the charity to signify trusted status. The transfer request may also contain information regarding the request. For example, the charity may specify that these resources are requested due to this sudden formation of a hurricane, which may specify the name of the hurricane and the date of this hurricane formation as well. Thus, the system receives information about both the requester (through the cryptographic token identifier) and the nature of the request (through the resource allocation request). By doing so, the system receives enough information to verify the request and make a determination of any contributed cryptographic resources that may satisfy the request.

In some embodiments, the system may verify the trustworthiness of the entity making the transfer request, as well as the identity of the requestor. That is, the system may retrieve an owner identifier, compare this identifier with data associated with a pre-existing token that verifies trustworthiness, and may decrypt the digital signature to determine that the transfer request is valid. For example, the system may search through blockchain transaction records for the cryptographic token identifier provided in the transfer request. The system may verify that the cryptographic token identifier, corresponding to a cryptographic token conferred for trustworthiness, matches an address to which the entity would like control of the requested resources transferred. By doing so, the system may verify that the owner of the requested entity's address was previously determined to be trustworthy (as evidenced by the conferral of the cryptographic token). The system may also decrypt the digital signature using a public key associated with the entity in order to determine that the sender of the request is the same as the claimed entity (i.e., the same as the entity associated with the cryptographic token). Thus, the system may verify the identity and trustworthiness of the requestor through these operations.

In some embodiments, the system may extract a classification and a date for the event or trigger behind the transfer request. That is, the system may extract, from the resource allocation request, a trigger classification and a trigger date. The system may transmit a trigger validation request that includes the classification and date to a validator node, and may receive a validation message that matches the trigger validation request from the validator node. As a result, the system may validate existence of the event and, as such, validate the resource allocation request. For example, the system may extract data indicating that the request is in response to a hurricane and may classify the request as hurricane related. Additionally, the system may extract a date from the resource allocation request. For example, the system may use a named entity natural language processing model to extract the date or other information related to the resource allocation request. By doing so, the system may extract more information regarding an event or trigger associated with the transfer request and, as such, may provide more context regarding the nature of the resources that have been requested.

The system may generate a request for a list of contributors and associated conditions for situations in which to distribute the contributed resources, and receive these lists in response. That is, the system may generate a first blockchain function request for a list of contributor identifiers and condition sets, and may receive the list of contributor identifiers and condition sets in response. For example, the system may have received a list of contributors, as well as conditions for which situations they may contribute information. These contributors may be, for example, donors who have contributed resources (e.g., cryptographic resources, or non-fungible tokens that act as vouchers for food or water during a storm) to a pool of resources on the blockchain, control of which has been relegated to on-chain programs. These resources may each be used for different purposes—some contributors may want their contributions to support climate emergencies, while others may wish to support entities that support sudden outbreaks of infectious diseases. In some cases, contributions may be useful to more than one cause. For example, some aid may be used for weapons for wars that have just broken out or may be used for solving energy crises during periods of drought or civil strife. Thus, contributors may provide lists of conditions to the system (or the relevant smart contract) detailing conditions for sharing this data with entities. For example, a contributor who has contributed cryptographic resources to an on-chain program for distribution, may specify that a trigger or an event must be classified as a "hurricane" for the resources to be shared with a relevant entity. In this way, the system enables contributors to provide resources only to desired events or triggers. The data may be encapsulated in a cryptographic token that has been committed to a blockchain.

In some embodiments, the system may generate the list of contributors (e.g., a list of their identities through their respective cryptography-based application addresses) and corresponding condition sets by querying an on-chain program to which this list and resources may have been provided. That is, the system may transmit, to an on-chain program, the first blockchain function request for the list of contributor identifiers and the condition sets and receive this list in response. As a result, the system may receive information about precisely which contributors may desire to share their resources with the entity requesting the resources.

The system may determine a subset of the list of contributor identifiers and condition sets that matches the resource allocation request. That is, the system may determine, from the list of contributor identifiers and the condition sets, a subset of the list of contributor identifiers and a corresponding subset of the condition sets. Each condition set in the corresponding subset of the condition sets may match the resource allocation request. For example, the system may, having determined a trigger classification (e.g., that the relevant trigger was a "hurricane"), determine which condition set has a condition that matches this classification. For example, a contributor of cryptographic resources may specify a desire to share these resources with entities only in the event of, and for a request directed towards, a "hurricane." Thus, the contributor may specify this in the corresponding condition set, which the system may subsequently match with the trigger classification. Thus, only a subset of contributor identifiers, for whom the condition sets match the resource allocation request, may be selected by the system, ensuring that the entity requesting the resources (e.g., a charity organization providing aid related to the hurricane) only receives relevant resources and data.

Having generated a subset of contributors who may contribute resources to the requesting entity, the system may generate a second request that contains this information and transmit this request to a blockchain node. That is, the system may generate a second blockchain function request including the subset of the list of contributor identifiers and the corresponding subset of the condition sets. The system may then send this operation request to a blockchain node, for example, for processing by an on-chain program. For example, the system may generate a request that includes the contributors and associated condition sets that are consistent with the resource allocation request, and may transmit the request to the on-chain program, which may then execute the blockchain function request. For example, the blockchain function request may include a command to transfer control of the cryptographic resources to a cryptography-based storage application associated with the entity (e.g., the aid organization requesting resources). Thus, the on-chain program may execute the command and give the requestor (e.g., Red Cross) access to this data. The system may also determine an amount of resources to transfer to the requesting entity, based on the contributions earmarked by donors, in a way that enables efficient and effective distribution of resources. By doing so, the system may ensure that the requesting entity receives resources that are desired, while also ensuring that the distributed resources match the intentions of the donors.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative data structure for a transfer request received from an entity, in accordance with one or more embodiments.

FIG. 3 shows an illustrative data structure for a list of contributor identifiers and condition sets, in accordance with one or more embodiments.

FIG. 6 shows illustrative components for a system used to distribute on-chain cryptographic resources based on conditions generated responsive to an off-chain trigger, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
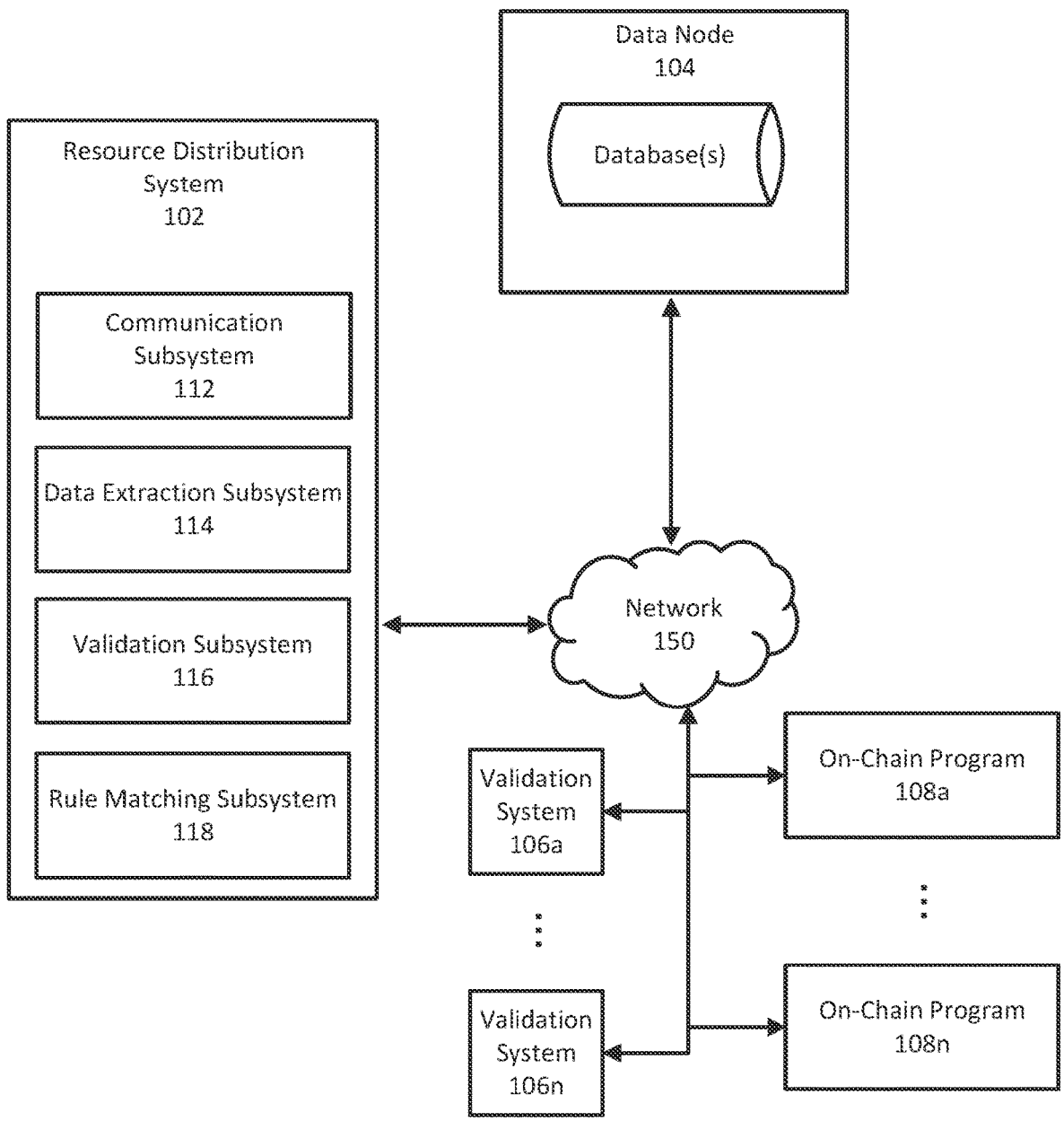
FIG. 1 shows an illustrative environment for distributing cryptographic resources on a blockchain through on-chain programs and validation nodes, in accordance with one or more embodiments.

FIG. 1 shows an illustrative environment for distributing cryptographic resources on a blockchain through on-chain programs and validation nodes, in accordance with one or more embodiments. For example, FIG. 1 describes a system that may be used to distribute cryptographic resources from contributors, who may have provided conditions for distribution to entities requesting resources, such as researchers or charities. Environment 100 may include resource distribution system 102, data node 104, network 150, on-chain programs 108a-108n, and validation systems 106a-106n. Resource distribution system 102 may include software, hardware, or a combination of both, and may reside on a physical server or a virtual server running on a physical computer system. In some embodiments, resource distribution system 102 may be configured on a user device (e.g., a laptop computer, a smartphone, a desktop computer, an electronic tablet, or another suitable user device). Furthermore, resource distribution system 102 may reside on a cloud-based platform and/or interface with cloud-based platforms, blockchains through on-chain programs 108a-108n, or validation systems 106a-106n. Resource distribution system 102 may include communication subsystem 112, data extraction subsystem 114, validation subsystem 116 and/or rule matching subsystem 118.

Data node 104 may store various data, including one or more transfer requests, lists of contributor identifiers and corresponding condition sets, resource allocation requests, cryptographic token identifiers, and/or other suitable data. Data node 104 may include software, hardware, or a combination of the two. In some embodiments, resource distribution system 102 and data node 104 may reside on the same hardware and/or the same virtual server or computing device. Network 150 may be a local area network, a wide area network (e.g., the Internet), or a combination of the two.

Resource distribution system 102 may receive a transfer request from an entity. That is, resource distribution system 102 may receive a transfer request from a device associated with an entity. For example, resource distribution system 102 may receive the transfer request via communication subsystem 112. In some embodiments, the transfer request may include a resource allocation request. For example, resource distribution system 102 may receive a request for cryptographic resources from a charity in response to a natural disaster affecting a particular region. This transfer request may be received at a system that may interact with smart contracts (e.g., on-chain programs 108a-108n) where contributors have already contributed resources for forwarding to such charitable entities, along with conditions to be satisfied before such forwarding. The transfer request may include information about the event or trigger that has occurred (e.g., a hurricane affecting the Florida coast, and that a certain number of resources are requested), as well as information about the entity requesting resources (e.g., metadata regarding the charity, such as a name, a cryptographic address associated with the charity, and/or other credential information). By accepting this information, resource distribution system 102 may collect enough information to further determine whether any conditions imposed by contributors have been satisfied and, as such, whether resources may be released towards the entity requesting these funds.

Resource distribution system 102 may receive data, such as the transfer request, resource allocation requests, lists of contributor identifiers and condition sets, and other validation information, through communication subsystem 112 from one or more devices on network 150. Communication subsystem 112 may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104, on-chain programs 108a-108n, validation systems 106a-106n and/or another computing device. Communication subsystem 112 may send or receive data, such as cryptographic token identifiers, validation messages, validation requests, transfer requests, and blockchain function requests. Communication subsystem 112 may communicate with data extraction subsystem 114, validation subsystem 116, or rule matching subsystem 118.

FIG. 2 shows an illustrative data structure 200 for a transfer request received from an entity, in accordance with one or more embodiments. For example, FIG. 2 may describe a data structure storing data received using communication subsystem 112 from a charity requesting cryptographic resources (e.g., cryptocurrency) in response to a hurricane affecting the Caribbean. Transfer request 202 may include fields such as cryptographic signature 204 generated by the requesting entity, cryptographic token identifier 206 for a cryptographic token associated with the entity, and resource allocation request 208 relating to the request for cryptographic resources.

As referred to herein, an entity may include any organization, user, or individual who may request resources. For example, an entity may include a scientific research organization, a charity or a non-profit organization. In some embodiments, the entity may possess a cryptographic token that validates that the entity is trusted. For example, the entity may, through the transfer request, provide a token identifier (e.g., cryptographic token identifier 206) that corresponds to this cryptographic token for validation. Validation subsystem 116 may verify the sender of the transfer request, the token validity, and the reputability of the entity. In some embodiments, the entity may possess a cryptography-based storage application (e.g., a cryptowallet), which may have an associated address, public key and private key.

As referred to herein, a resource allocation request may include data pertaining to requested resources. For example, the resource allocation request may include an amount of requested resources 214 in a unit of cryptocurrency, as shown as a field within resource allocation request 208 in FIG. 2. The resource allocation request may also include information that characterizes the reason for the request. For example, the resource allocation request may include a date of an event or trigger (e.g., event date 210), a classification of the trigger (e.g., event classification 212), additional information pertaining to the trigger or event (e.g., additional information 218), as well as an address for a cryptography-based storage application to which control of the requested resources should be assigned (e.g., cryptowallet address 216). For example, an entity may include additional information 218 that explains that a particular hurricane is affecting parts of the Caribbean and, as a result, aid of 80.00 ether (ETH) is requested to be sent to be controlled by cryptographic address 216 controlled by the entity. By including information related to the trigger event in the transfer request in the form of a resource allocation request, resource distribution system 102 may include sufficient information about the nature of the request such that it may verify that it occurred. Alternatively, or additionally, resource distribution system 102, through rule matching subsystem 118, may further utilize the information within resource allocation request 208 to match the conditions associated with contributors of resources in a manner that allows for efficient distribution of the contributors' resources.

Resource distribution system 102 may extract a trigger classification and a trigger date from the resource allocation request, for example, through data extraction subsystem 114 shown in FIG. 1. Communication subsystem 112 may transmit a trigger validation request to a validator node. The trigger validation request may include the trigger classification and the trigger date. Communication subsystem 112 may receive from the validator node a validation message that matches the trigger validation request and may, in response to receiving this validation message, verify the resource allocation request. For example, data extraction subsystem 114 may extract a classification of the trigger underpinning the request for cryptographic resources from the entity, as well as a date corresponding to this trigger. As shown in FIG. 2, resource allocation request 208 may include a hurricane as event classification 212, which data extraction subsystem 114 may interpret as a trigger classification. Resource distribution system 102 may also extract a date from the resource allocation request, such as event date 210. In response to extracting this information, validation subsystem 116 may transmit to a validator node a trigger validation request, which may include this information. By doing so, resource distribution system 102 requests validation of the events on which the transfer request is based. For example, resource distribution system 102 may submit a request to verify whether Hurricane Zeta, as stated in additional information 218, is indeed a hurricane that has caused damage. Communication subsystem 112 may, in response to this request, receive information from a validator node (e.g., one of validation systems 106a-106n) that may match the information in the resource allocation request, including the date and event classification. If this information, in the form of the validation message, matches the resource allocation request, validation subsystem 116 may generate and transmit a message that the resource allocation request is valid and, thus, that the information provided by the entity in the transfer request is consistent with a third party source associated with the validator node. By doing so, resource distribution system 102 may reduce the incidence of fraudulent requests for cryptographic resources in response to fake triggers or events.

As shown in FIG. 1, resource distribution system 102 may include data extraction subsystem 114, which may allow data, such as trigger classifications and trigger dates, to be extracted from data structures, such as the resource allocation request or the transfer request. Data extraction subsystem 114 may include software components, hardware components, or a combination of both. In some embodiments, data extraction subsystem 114 may extract information or data from data structures received from communication subsystem 112, validation subsystem 116, or rule matching subsystem 118. This may include information originating in data node 104 or any other location connected to network 150, such as on-chain programs 108a-108n or validation systems 106a-106n. For example, data extraction subsystem 114 may extract data from a transfer request received from an entity through communication subsystem 112 by locating fields within a data structure associated with the transfer request (e.g., transfer request 202). Data extraction subsystem 114 may locate, for example, the field corresponding to cryptographic token identifier 206 and extract the token identifier accordingly. In some embodiments, data extraction subsystem 114 may extract information that may not be in data structures as shown in FIG. 2. For example, data extraction subsystem 114 may parse text data, such as an email message in the form of an alphanumeric text string, and, in some embodiments, may process this text data through natural language processing in order to extract information, such as event classification 212, from resource allocation request 208.

As referred to herein, a trigger classification may include data that characterizes a trigger, event or another occurrence related to the transfer request. For example, a trigger classification may include a classification of a natural disaster event, a humanitarian emergency, a scientific discovery, or any other reason for which an entity may request resources. For example, a trigger classification may include a classification of a weather event (e.g., event classification 212, which depicts a hurricane), a type of humanitarian disaster (e.g., a war breaking out), or a scientific need for resources (e.g., the outbreak of a disease). The trigger classification may have an associated trigger date, which may include any characterization of a time for the trigger. For example, a trigger date may include a date that a hurricane made landfall in a Caribbean island for which aid is requested, or may include a day on which a number of refugees requested asylum due to a war. In some embodiments, a resource allocation request may include various trigger classifications. For example, where an entity requests resources in response to a hurricane, the resource allocation request may include a trigger classification classifying the event as a "hurricane," a "natural disaster," a "climate emergency," or a "hydrological event." In some embodiments, data extraction subsystem 114 may generate or determine trigger classifications or trigger dates in response to the resource allocation request, even if the resource allocation request does not explicitly include a classification. For example, through a natural language processing model, data extraction subsystem 114 may determine that a request for resources in response to an earthquake may be assigned a trigger classification of "natural disaster," even if these words are not included in the request itself. A trigger classification may include objective information about the event, such as the number of casualties from a natural disaster or a war. One or more trigger classifications or trigger classification types may correspond to condition sets associated with contributor identifiers, as discussed below.

As shown in FIG. 1, resource distribution system 102 may include validation subsystem 116, which may perform tasks related to validating transfer requests and other information. Validation subsystem 116 may include software components, hardware components, or a combination of both. In some embodiments, validation subsystem 116 may extract information or data from data structures received from communication subsystem 112, data extraction subsystem 114, or rule matching subsystem 118, including information originating in data node 104 or any other location connected to network 150, such as on-chain programs 108a-108n or validation systems 106a-106n. For example, validation subsystem 116 may perform tasks related to extracting trigger classification and trigger date data through data extraction subsystem 114, as well as generating trigger validation requests and transmitting these requests to validator nodes through communication subsystem 112. Validation subsystem 116 may perform tasks related to matching validation messages from validator nodes, to determine whether information within the resource allocation request (e.g., the trigger classification or trigger date) match the contents of the validation messages from the validator nodes, in order to verify the resource allocation request. In some embodiments, validation subsystem 116 may use cryptographic token identifier information to extract metadata related to the entity, in order to validate the reputation of the entity, as discussed below. In some embodiments, validation subsystem 116 may validate the ownership of the cryptographic token, an identifier of which may be provided in the transfer request. Validation subsystem 116 may validate digital signatures, such as cryptographic signatures, by, for example, utilizing a public key to validate a message signed using the entity's private key. By validating these various stages and parts of the transfer request, validation subsystem 116 may mitigate against fraudulent or exploitative requests by entities.

As referred to herein, a validator node may refer to a computing node that provides validation of information. A validation node may, for example, include one or many validation systems 106a-106n. A validation node, as well as the associated validation systems 106a-106n, may include software components, hardware components, or a combination of both. For example, a validation node may be a server, such as one associated with a press organization, which may be able to verify the occurrence of trigger events, such as natural disasters or humanitarian emergencies. In some embodiments, a validator node may provide information regarding the entity itself. For example, a validator node, through one or more validation systems 106a-106n, may communicate with an organization that provides information about the trustworthiness of charities (e.g., Charity Navigator), which may enable resource distribution system 102 to verify the reputation of a requester, such as a charity.

As referred to herein, a trigger validation request may include a request for validating information related to the trigger. For example, a trigger validation request may include information related to the trigger extracted from the resource allocation request, such as a trigger classification and a trigger date. The trigger validation request may include further information specifying the event, such as the name of a hurricane or the affected geographic regions. By including information from the resource allocation request and requesting validation of this information, resource distribution system 102, through validation subsystem 116, may ensure that the resource allocation request is valid and, if needed, in some embodiments, may correct this information according to information received in response to the trigger validation request (e.g., within the validation message received from the validation node).

As referred to herein, a validation message may include a message that enables validation of information. For example, a validation message may include a statement that information provided to a validator node through the trigger validation request (e.g., a hurricane name, a corresponding landfall date, and a corresponding number of casualties due to the hurricane) is accurate. In some embodiments, the validation message may include information that adds to or corrects the trigger validation request, such as an updated number of casualties in response to a hurricane, or an updated hurricane category. By receiving a validation message from a third party, resource distribution system 102 may ensure that any information received in the transfer request, such as data within the resource allocation request, may be validated for accuracy, in order to prevent the risk of fraud, misinformation, or mistakes within the transfer request. By doing so, validation subsystem 116 may evaluate and deny any requests for distribution of cryptographic resources upon discovery that information in the resource allocation request is wrong or mischaracterized.

Resource distribution system 102 may, in some embodiments, extract an owner identifier from a cryptographic token identifier supplied in the transfer request and determine whether a cryptography-based storage application address (e.g., a cryptowallet address) from the transfer request matches the owner identifier. Validation subsystem 116 may determine that the cryptographic token is controlled by the corresponding cryptography-based storage application through decryption of the digital signature. By confirming both that the address matches the owner identifier, as well as that the digital signature is from the owner of the cryptography-based storage application, validation subsystem 116 may determine that the transfer request is valid. That is, resource distribution system 102 may extract, from a cryptographic token corresponding to a cryptographic token identifier included in the resource allocation request, an owner identifier. The owner identifier may indicate an identifier of a cryptography-based storage application that controls the cryptographic token. Resource distribution system 102, through validation subsystem 116, may determine that a cryptography-based storage application address received with the resource allocation request matches the owner identifier. Resource distribution system 102 may determine, based on decrypting a digital signature included in the transfer request using a public key associated with the entity, that the cryptography-based storage application that controls the cryptographic token corresponds to the resource allocation request. In response to determining that the cryptography-based storage application address received with the resource allocation request matches the owner identifier and the cryptography-based storage application that controls the cryptographic token corresponds to the resource allocation request, resource distribution system 102 may determine that the transfer request is valid.

For example, data extraction subsystem 114 may extract a token identifier provided by the entity in the transfer request. The token identifier may be identified in a field, such as a field corresponding to cryptographic token identifier 206 in FIG. 2. Control of the cryptographic token may have been previously provided to only trustworthy entities in some embodiments. Validation subsystem 116 may subsequently determine an owner identifier from the cryptographic token identifier. For example, validation subsystem 116 may, from the token identifier, identify or locate a uniform resource identifier (URI), which may include a uniform resource locator (URL) and/or a uniform resource name (URN), which may point to information about the owner. In some embodiments, communication subsystem 112 may search through blockchain records or submit a request to a blockchain for an owner identifier corresponding to the owner of the token controlled by the token identifier. Resource distribution system 102 may subsequently compare this owner identifier with the cryptography-based storage application that may be included in the resource allocation request (e.g., a field in FIG. 2 for cryptowallet address 216) and determine whether the two match. By determining that the cryptographic token referred to in the transfer request is associated with the cryptowallet for which resources are requested, validation subsystem 116 may check whether the requester is trusted, as signaled by the corresponding wallet address's association with the cryptographic token. Thus, resource distribution system 102 may handle any contributors' cryptographic resources in a manner that protects contributors from fraud or misrepresentation.

Data extraction subsystem 114 may, in some embodiments, validate the digital signature provided in the transfer request. For example, validation subsystem 116 may extract a digital signature from the transfer request and utilize a public key associated with an entity to decrypt the digital signature. For example, the digital signature may constitute a hash that has been signed by an Elliptical Curve Digital Signature Algorithm (ECDSA) algorithm by the entity, and, by using the public key associated with the entity, validation subsystem 116 may recover the hash and compare the result with the original hash to ensure that the signature was generated by the entity. By doing so, validation subsystem 116 may ensure that the message was sent by the claimed entity and, in response, resource distribution system 102 may deem the transfer request valid.

As referred to herein, the term "cryptographic token" refers to a data structure recorded on a blockchain that represents a token control of which may be passed from one identifier to another (e.g., from one cryptographic address to another). The token may represent a good, a service, or another entity. For example, a cryptographic token may be a non-fungible token. In some embodiments, a cryptographic token may include a URI (e.g., a URL or a URN), and may include an identifier (i.e., a cryptographic token identifier). A cryptographic token may be provided to entities that are deemed trustworthy, and may include or link to information related to the entity, such as a URL to a website with information about a charity making a transfer request. A cryptographic token may include an identifier, such as an alphanumeric text string, or an associated smart contract, which allows the token to be identified in transactions made on a blockchain. Thus, a cryptographic token may represent an entity and its trustworthiness and/or reputability.

As referred to herein, the term "owner identifier" refers to an identifier (e.g., a blockchain address) of a cryptography-based storage application (e.g., a cryptographic wallet). For example, an owner identifier may include a cryptography-based storage application address, such as any identifier of a cryptography-based storage application that enables a user to transfer tokens or other items/data that are stored on a blockchain network. In some embodiments, an owner identifier may be a public key, or may be equivalent to one or more transformations of a public key (e.g., one or more hashes of a wallet's public key). The owner identifier may be alphanumeric and may include an alphanumeric string between 10-50 characters long. Alphanumeric strings with different character length may be used as well. By extracting an owner identifier, validation subsystem 116 may ensure that the cryptographic token identifier provided in the transfer request is indeed associated with the cryptography-based storage application to which resources are requested.

As referred to herein, the term cryptography-based storage application refers to any type of application, software or program that enables access to cryptographic resources, such as cryptographic tokens. In some embodiments, a cryptography-based storage application may enable access to, for example, cryptocurrencies, security tokens and/or non-fungible tokens. In some embodiments, cryptography-based storage applications may have associated addresses, known as cryptography-based storage application addresses, which may include alphanumeric strings that are allocated on a blockchain network. In some embodiments, the cryptography-based storage application address may correspond to the cryptography-based storage application's public key. Furthermore, the cryptography-based storage application may store a private key. By utilizing cryptography-based storage applications and their related security features, cryptographic assets may not only be stored securely, but they may also be transferred securely using, in some embodiments, asymmetric encryption, such as an ECDSA. Cryptography-based storage applications, thus, provide resource distribution system 102, contributors and on-chain programs 108a-108n, the means for transferring, controlling or otherwise modifying cryptographic resources, which allows for control over the distribution of cryptographic resources upon the occurrence of a trigger event.

As referred to herein, the term "digital signature" refers to any electronic indication of the authenticity of digital information, such as a message or, in some embodiments, a transfer request. For example, a digital signature may include a cryptographic signature, or another mathematical scheme for verifying the authenticity of digital messages or documents. A digital signature may employ asymmetric cryptography. For example, a digital signature may be a hash of a message that has been encrypted using a private key associated with the sender; the digital signature may be affixed to the message and sent to the receiver. The receiver may then verify the signature by independently generating a hash of the same message and decrypting the signature using the public key associated with the sender. For example, a function (e.g., ECDSA) may be applied to a message (or the hash of a message) with the private key of the second cryptography-based storage application belonging to the sender (e.g., cryptographic signature 204). The data access system, or any node of the blockchain may verify that the request is indeed coming from the second cryptography-based storage application by applying a function with the public key to the digital signature and comparing the result to the expected message (or the hash of the message). If the expected message and/or hash is equivalent to the result of applying the function, then the data access system can verify that the request is coming from the cryptography-based storage application associated with the private and public keys. Any suitable functions and/or alternative digital signature schemes may be used, such as Probabilistic Signature Scheme (PSS), and/or the like. By doing so, validation subsystem 116 may ensure that the transfer request was indeed sent by the entity claiming to send the request.

Resource distribution system 102 may generate a first blockchain function request for a list of contributor identifiers and condition sets. For example, communication subsystem 112 may create and transmit a request for contributor identifiers and/or condition sets to a blockchain node. Resource distribution system 102 may request, from a smart contract (e.g., through a blockchain node), a request for information regarding users or devices who have submitted cryptographic resources for further distribution to entities, as well as sets of conditions to be satisfied before further distribution. In response to the first blockchain function request, resource distribution system 102 may receive, through communication subsystem 112, the list of contributor identifiers and condition sets. For example, in response to the first blockchain function request for information regarding contributors and their corresponding conditions for distributing cryptographic resources, resource distribution system 102 may receive a corresponding list from the smart contract (i.e., from a blockchain node that interfaces with the smart contract). As referred to herein, a blockchain function request may include any request to perform a task, operation or process on a blockchain. For example, a blockchain function request may include a request, to a blockchain node, to transfer control of a cryptographic resource from one cryptography-based storage application to another. In some embodiments, a blockchain function request may include a request for information related to a smart contract (e.g., lists of contributor identifiers and/or condition sets), or any other metadata relating to a smart contract, cryptographic token or transaction. By sending blockchain function requests and receiving responses to those requests, communication subsystem 112 may interface with information and data stored on blockchains. Thus, these blockchain function requests enable validation subsystem 116 to receive enough information to determine how to effectively allocate cryptographic resources contributed to a smart contract on the blockchain, as well as to validate and provide data to the smart contract regarding any requests for contributed cryptographic resources.

FIG. 3 shows an illustrative data structure for a list of contributor identifiers and condition sets, in accordance with one or more embodiments. For example, data structure 302 may include a list of contributor identifiers 304 and corresponding condition sets 306. For example, condition sets 306 may include a trigger class 308 that a resource allocation request may match before conditions are met for distributing a contributors' resources. Condition sets 306 may include a trigger date 310 that refers to conditions that the trigger must satisfy before distribution. Condition sets 306 may, in some embodiments, define maximum annual contribution 312, for example, above which a contributor may not wish for resources to be distributed.

As referred to herein, a list of contributor identifiers may include a list of any identifying information of contributors. For example, contributor identifiers may include names, usernames, device identifiers, or cryptography-based storage application addresses, as contributor identifiers 304 are shown in FIG. 3. A contributor may refer to a user, organization, or device that has contributed cryptographic resources to, for example, an on-chain program for further distribution to entities that request these resources. For example, a contributor may include a benefactor with cryptographic resources, such as cryptocurrency reserves, that have been provided to a smart contract for the purpose of distributing to entities that provide emergency research for infectious disease outbreaks, which may then be requested by an entity researching COVID-19 in response to an outbreak of the infection. The smart contract or on-chain program may distribute the resources provided by the contributor through provided condition sets. A contributor may include a donor of resources to be distributed by a smart contract to charities in response to humanitarian disasters, such as hurricanes or wars. A contributor identifier, as requested by resource distribution system 102, refers to these contributors in a manner that allows the smart contracts to identify specific contributors and their associated condition sets, such that the smart contract may distribute these contributed resources in accordance with the contributors' wishes.

As referred to herein, a list of corresponding condition sets may include a representation of conditions imposed by contributors of cryptographic resources, for example, to a smart contract or on-chain program. For example, FIG. 3 shows that particular contributors (identified by contributor identifiers 304) may have specific classes for which their contributed resources should be distributed (e.g., trigger class 308 or trigger date 310), and may include other information, such as maximum annual contribution 312. By retrieving condition sets corresponding to the contributors, resource distribution system 102 enables contributors to specify exactly which circumstances in which to distribute funds and for what purposes. For example, in response to a transfer request due to a hurricane damaging islands in the Caribbean (e.g., as shown in transfer request 202), only some contributors may want to contribute to this transfer request. For example, the first contributor within contributor identifiers 304 may only want to contribute up to 10 ETH to the cause of a hurricane, while the second contributor within contributor identifiers 304 may wish to only contribute cryptocurrency reserves to an earthquake that occurred before 08/18/2025 and, thus, not in response to transfer request 202 in particular. The third contributor, on the other hand, has a maximum contribution limit of 120 ETH and, as such, may partially satisfy the transfer request to a maximum of 80 ETH, but may have funds leftover to donate to other causes. Thus, receiving condition sets associated with the list of contributor identifiers allows resource distribution system 102 to determine whose resources to contribute in service of the transfer request in an efficient and desired manner, if any at all.

Figure 4:
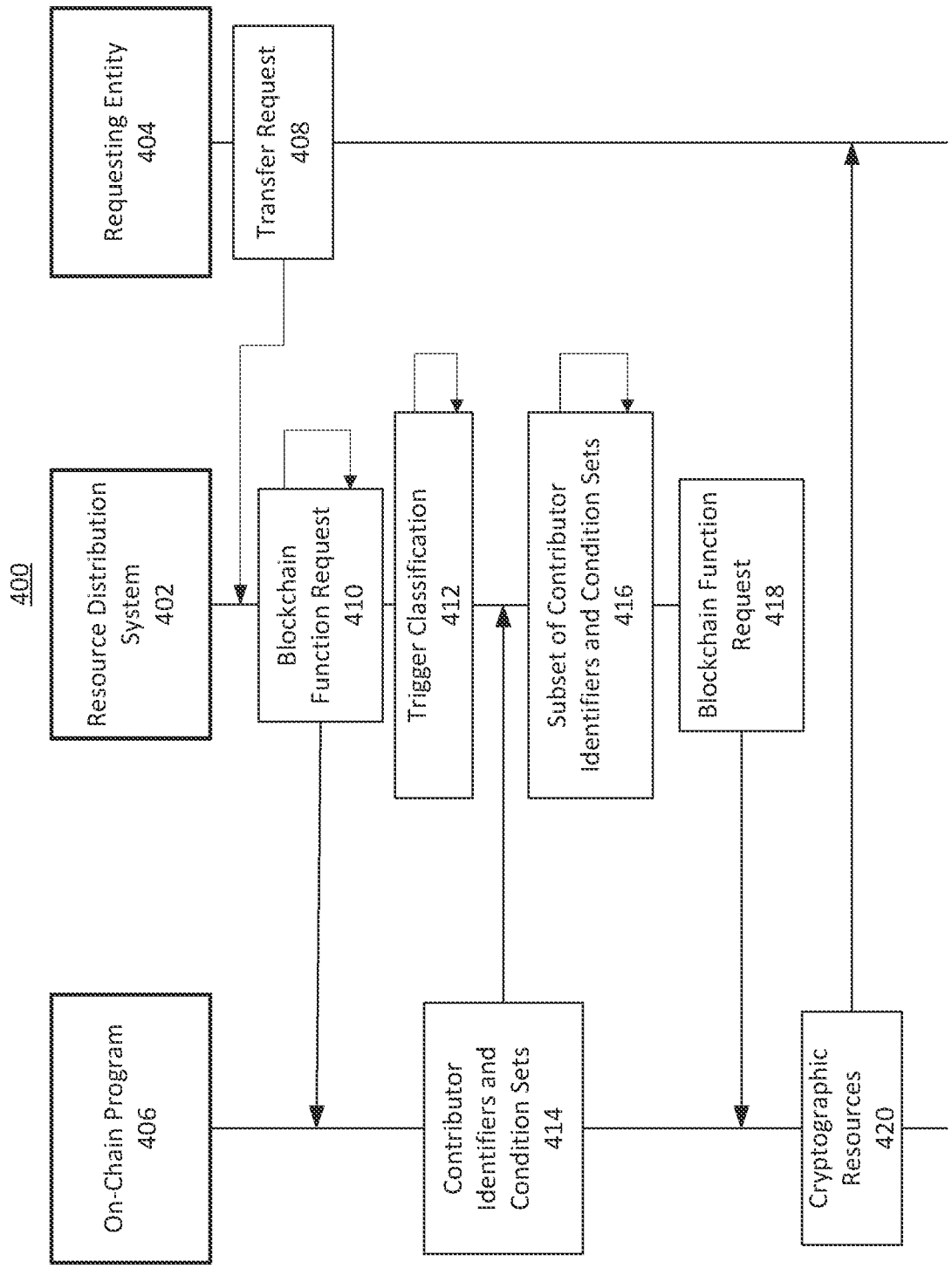
FIG. 4 shows an illustrative workflow for distributing cryptographic resources in response to a transfer request responsive to a trigger or an event, in accordance with one or more embodiments.

FIG. 4 shows illustrative workflow 400 for distributing cryptographic resources in response to a transfer request responsive to a trigger or an event, in accordance with one or more embodiments. In some embodiments, resource distribution system 402 (e.g., equivalent to resource distribution system 102) may receive transfer request 408 from requesting entity 404. A smart contract for distribution of resources may be implemented through on-chain program 406, for example. For example, communication subsystem 112 may receive transfer request 408 from requesting entity 404. In some embodiments, transfer request 408 may include a resource allocation request (as shown in FIG. 2, resource allocation request 208), and may include additional information about the entity, such as a cryptographic token associated with the entity and a digital signature for the transfer request. In some embodiments, data extraction subsystem 114 may generate a trigger classification (e.g., trigger classification 412) based on transfer request 408 or a resource allocation request therein.

Based on receiving the transfer request, resource distribution system 402 may generate a first blockchain function request (e.g., blockchain function request 410) as discussed above and receive, in response to the first blockchain function request, the list of contributor identifiers and corresponding condition sets. In some embodiments, resource distribution system 402 may transmit, to on-chain program 406, the first blockchain function request for the list of contributor identifiers and the condition sets. In response to first blockchain function request 410, resource distribution system 402 may receive, from on-chain program 406, the contributor identifiers and the condition sets 414. By interfacing with on-chain program 406, which may be responsible for maintaining control of the resources contributed to (e.g., a smart contract), resource distribution system 402 may receive contributor information directly from the decision-making contract and, as such, receives updated information regarding the contributors and corresponding conditions for distributing resources.

As referred to herein, the term "on-chain program" refers to a program that resides on a blockchain and is executed by a blockchain node. On-chain program 406 represents an on-chain program and may include any task, process, transaction, operation, algorithm or contract that may be executed on a blockchain. For example, an on-chain program may be a smart contract, which may include a transaction protocol or a computer program that automatically executes, controls or documents events, actions or tasks according to the terms of a contract or an agreement. For example, an on-chain program may be a program that is designed to distribute cryptographic resources that have been contributed by contributors only when conditions are met. Conditions may be met upon receipt of a request for these contributed resources that match conditions imposed by the contributors, for example, as shown in data structure 300 in FIG. 3. On-chain programs, such as on-chain programs 108a-108n, may interface with network 150 in order to communicate with resource distribution system 102 or 402. Thus, on-chain program 406 may send and receive information, such as transfer requests or other requests for distribution of cryptographic resources, through resource distribution system 102. By utilizing a smart contract or an on-chain program, contributors may contribute cryptographic resources that are already documented or controlled via the blockchain to the smart contract, allowing for verification (e.g., through proof-of-work or proof-of-stake) and other benefits that are conferred by decentralized blockchain functions.

Returning to FIG. 1, resource distribution system 102 may determine a subset of the list of contributor identifiers and corresponding condition sets that match the requirements of the relevant contributors. That is, resource distribution system 102 (e.g., through rule matching subsystem 118) may determine, from the list of contributor identifiers and the condition sets, a subset of the list of contributor identifiers and a corresponding subset of the condition sets (e.g., contributor identifiers and condition sets 414, as shown in FIG. 4). Each condition set in the corresponding subset of the condition sets may match the resource allocation request. For example, FIG. 2 shows that transfer request 202 includes resource allocation request 208, which includes information about a hurricane that is damaging islands in the Caribbean. Rule matching subsystem 118 may match the transfer request with only those condition sets that also express a desire to contribute to the cause of a hurricane affecting islands in the Caribbean. By determining which condition sets match the transfer request or resource allocation request, rule matching subsystem 118 enables contributors to maintain control of whether their contributed resources to the smart contract are distributed or not, and under what conditions. By doing so, resource distribution system 102 ensures that any resources contributed to a smart contract for this purpose are only distributed with the consent of the contributors and only if beneficial to the requesting entity.

In some embodiments, determining the subset of condition sets and contributor identifiers may include extracting a trigger classification, determining a subset of condition sets based on this trigger classification, and determining a subset of contributor identifiers based on this subset of condition sets. That is, resource distribution system 102 may extract, from the resource allocation request, a trigger classification. Rule matching subsystem 118 may determine the subset of the condition sets, wherein each condition set in the subset of the condition sets includes a trigger condition matching the trigger classification. Rule matching subsystem 118 may determine the subset of the list of contributor identifiers that correspond to the subset of the condition sets. Based on this resource allocation request, data extraction subsystem 114 may extract a trigger classification and/or a trigger date (i.e., classification as a hurricane or a natural disaster, and an event date of Sep. 25, 2025). Rule matching subsystem 118 may compare the trigger classification, trigger date, or any other information within the resource allocation request with trigger conditions stated in condition sets 306. For example, rule matching subsystem 118 may determine that a hurricane matches the first row of condition sets as it also refers to a hurricane before Dec. 25, 2029, while the hurricane of the resource allocation request does not match the second row of conditions, as a hurricane is not an earthquake. However, the third row of conditions may match, as a hurricane is a type of natural disaster, and the hurricane of the resource allocation request occurred after Jul. 23, 2024. Thus, rule matching subsystem 118 may match the first and third rows with the resource allocation request but not the second and, in response, may determine a subset of the condition sets that only includes the first and third rows. As contributors may desire to distribute contributed resources only in response to certain triggers (e.g., a weather enthusiast may only desire to contribute cryptographic resources to causes related to weather emergencies), rule matching subsystem 118, by considering a trigger classification, allows the distribution of resources only if a classification related to the trigger matches the conditions stated in the condition sets of the contributors.

Resource distribution system 102 may include rule matching subsystem 118. Rule matching subsystem 118 may include software components, hardware components, or a combination of both. For example, rule matching subsystem 118 may include software components, or may include one or more hardware components (e.g., processors) that are able to execute operations for matching condition sets with resource allocation requests. For example, rule matching subsystem 118 may match trigger classifications, trigger dates or other information underpinning a resource allocation request for resources by an entity with cryptographic resources contributed by contributors, as well as associated conditions established by the contributors. Rule matching subsystem 118 may make direct matches between fields within data structures 200 and 300, in some embodiments, to determine whether a match has been satisfied. In some embodiments, rule matching subsystem 118 may utilize a machine learning model, where the transfer request and condition sets may be included as input for a machine learning model, with the output including a classification as to whether the resource allocation request and condition sets are a match. For example, rule matching subsystem 118 may, having matched contributor identifiers and condition sets 414 provided by on-chain program 406 and, in response, may determine a subset of contributor identifiers and condition sets 416 where the resource allocation request matches each condition set imposed by a contributor.

As referred to herein, a trigger condition may include any condition for distributing contributed resources. For example, a trigger condition may include a condition for when a resource allocation request or event must occur (e.g., trigger date 310), a condition for what type of event has occurred to warrant the resource allocation request (e.g., a trigger class 308), or may include a condition for a maximum or minimum amount of resources or type of resources to contribute (e.g., maximum annual contribution 312). Trigger conditions may be represented as a data structure, as in condition sets 306, or may be represented as logical operators between parameters, such as between parameters included in the resource allocation request and analogous parameters included within a contributors' condition sets. In order to make a match between a resource allocation request and a particular condition set associated with a contributor, rule matching subsystem 118 may consider only one of the trigger conditions within a condition set. In some embodiments, multiple trigger conditions within the condition set must be satisfied or matched with the resource allocation request before the condition set is included in the subset of condition sets. In some embodiments, trigger conditions themselves may depend on each other. For example, a contributor may specify in a condition set that a hurricane may have a maximum annual contribution of 10 ETH, but an earthquake may have a maximum annual contribution of 20 ETH.

Resource distribution system 402 may generate blockchain function request 418, for example, to on-chain program 406. That is, resource distribution system 402 may generate a second blockchain function request and transmit the second blockchain function request to a blockchain node. The second blockchain function request may include at least a portion of the transfer request. For example, resource distribution system 402 may generate a message to transmit to a smart contract associated with on-chain program 406 stating details of the transfer request, such as a cryptography-based storage application address associated with the requesting entity. The message to be included in the blockchain function request may include information about which contributor identifiers and corresponding condition sets match and, in some embodiments, the second blockchain function request may include a suggestion for how to distribute the contributed resources according to the subset of condition sets and the subset of the list of contributor identifiers. Thus, once the validation and/or matching process has completed, resource distribution system 402 may generate and transmit a request to the smart contract (e.g., request 418) to distribute cryptographic resources 420 to requesting entity 404. By doing so, resource distribution system 402 ensures that, once contributors are matched with the transfer request, any matched resources may be transferred (e.g., through the on-chain program or smart contract) to the requesting entity without delay. In the event of a disastrous trigger, such as a hurricane or a war breaking out, the fact that this request for transferring the resources to the requesting entity may be automatic and immediate on the blockchain ensures that control of any requested resources is transferred as soon as possible; in some situations, this process could be the difference between life and death.

In some embodiments, generating the second blockchain function request may include extracting an indication of cryptographic resources requested by the transfer request, and generating a command to transfer the indication of cryptographic resources to the entity. That is, resource distribution system 102 may extract, from the resource allocation request, an indication of cryptographic resources (e.g., requested resources 214 in FIG. 2) requested by the transfer request and an address of the cryptography-based storage application (e.g., cryptowallet address 216 in FIG. 2) to be assigned to control the cryptographic resources. Resource distribution system 102 may generate, within the second blockchain function request, a command to transfer the indication of cryptographic resources to the address of the cryptography-based storage application according to the subset of the list of contributor identifiers and the corresponding subset of the condition sets. For example, resource distribution system 102 may extract a cryptowallet address from the transfer request which could, for example, identify a charity's cryptowallet. Data extraction subsystem 114 may extract an indication of cryptographic resources (e.g., an amount of a cryptocurrency) requested in response to the trigger event. Thus, resource distribution system 102 may generate the second blockchain function request such that it includes a request to transfer resources from the contributors whose condition sets matched the resource allocation request, to the cryptowallet address provided by the entity requesting the resources. For example, resource distribution system 402 may generate blockchain function request 418 such that cryptographic resources 420 are transferred to requesting entity 404 from contributed resources associated with on-chain program 406. By alerting the smart contract of information regarding the transfer request, including the transfer request's or entity's validity or trustworthiness, the smart contract may then determine whether its underlying rules have been satisfied and may, in response, proceed with the distribution of resources.

In some embodiments, resource distribution system 102 may generate the command according to the subset of the list of contributor identifiers and the corresponding subset of condition sets. Resource distribution system 102 may determine a particular allocation or proportion of resources to be sent from each contributor's contributed resources. For example, based on the first and third rows of condition sets 306 matching resource allocation request 208, resource distribution system 102 may include, in the second blockchain function request, a command to only transfer 10 ETH from the first contributor identifier and the remaining 70 ETH from the second contributor identifier in a way that matches each contributor's condition sets individually based on maximum annual contribution 312. Thus, resource distribution system 102 may determine how to efficiently and effectively allocate resources contributed by contributors while working within any constraints imposed by these contributors. Resource distribution system 102 may include this determination in the second blockchain function request in order to relay this information to the relevant smart contract or on-chain program.

As referred to herein, a "cryptographic resource" may include any asset, feature or element that may be a transferrable digital representation. In some embodiments, cryptographic assets may be designed in a way that prohibits their copying or duplication and may include cryptocurrency reserves. In some embodiments, cryptographic assets may comprise non-fungible tokens, or security tokens, such as a token that represents a car's vehicle identification number. Cryptographic resources may also include data, such as results or databases, which may be stored within the cryptographic data or as linked to a cryptographic token, for example. An indication of cryptographic resources may refer to, for example, a type of cryptographic resource or data or, in some embodiments, may refer to a value of cryptocurrency desired by the requesting entity. Cryptographic resources (e.g., cryptographic resources 420) may be requested by the entity, or may be transferred from contributors or a smart contract to the entity. Cryptographic resources may be assigned by contributors or other users for distribution to other entities. Due to blockchain authentication and transaction validation mechanisms (e.g., proof-of-work or proof-of-stake) and the decentralized nature of these transactions, as well as their portability, flexibility and ability to store diverse types of information, cryptographic resources may be useful to any entities requesting resources or support.

In some embodiments, the second blockchain function may not include contributors depending on a calculated reputability score for the entity. That is, validation subsystem 116 may determine a reputability score of the entity, and, based on this reputability score being below a threshold, validation subsystem 116 may generate the second blockchain function request to not include any contributors. For example, validation subsystem 116 may determine, for example, through a third party, that the requesting entity has a poor reputation for fraudulent activity in terms of charitable work. Having made this determination, validation subsystem 116 may assign a poor reputability score (e.g., a reputability score below a threshold) for the entity and, as a result, the second blockchain function request may relay this information to the relevant on-chain program or smart contract. In some embodiments, the second blockchain function request may include a subset of condition sets and a subset of the list of contributor identifiers that are empty to signal this low reputability score. By doing so, validation subsystem 116 may ensure that any contributed resources are not contributed to entities (e.g., charities or organizations) with poor reputations or with high risk. Thus, resource distribution system 102 may mitigate the chance that resources are sent to an entity or organization that may mishandle the received cryptographic resources, which minimizes risk to the contributors and smart contract.

As referred to herein, a reputability score may include a measure, indication or metric relating to the reputation of an entity, organization, user, device or server. For example, a reputability score may include a score of "star" values from 1 to 5, with 1 denoting a poor reputation and 5 denoting a good reputation. The reputability score may be calculated based on qualities, features or requirements of the particular entity, contributor or smart contract in question. For example, an entity associated with a charity may have a reputability score determined by a percentage of donations that are directly utilized in solving the given problem, as well as a degree of corruption or public visibility. In some embodiments, reputability scores may be determined by external or third party individuals, and may be included as a trigger condition provided by contributors within condition sets. In some embodiments, a threshold reputability score (i.e., the threshold, as referred to above) may be required before resource distribution system 102 allows a requesting entity to receive cryptographic resources. The threshold may refer to a minimum value of a reputability score that must be achieved before cryptographic resources are distributed. The threshold may be determined by contributors, in some embodiments. By assigning entities with a reputability score, validation subsystem 116 enables resource distribution system 102 to ensure that only entities with sufficient trustworthiness or reputation are given resources.

In some embodiments, determining the reputability score of the entity may include extracting metadata related to the entity and determining the reputability score based on this entity metadata. That is, resource distribution system 102 may extract, from the transfer request, a cryptographic token identifier associated with the entity. Resource distribution system 102 may determine, using the cryptographic token identifier, a URI corresponding to a cryptographic token associated with the cryptographic token identifier, and retrieve entity metadata using a resource locator associated with the URI. Based on the entity metadata, resource distribution system 102 may determine the reputability score for the entity. For example, data extraction subsystem 114 may extract cryptographic token identifier 206 from the transfer request, which corresponds to the entity. The cryptographic token identifier may include a URI and corresponding URL, which may serve as a resource locator. The resource locator may refer to a location that includes entity metadata, where the entity metadata may include information regarding the entity. For example, the resource locator may refer to a website, such as Charity Navigator, that ranks or evaluates charity organizations, one of which may be the entity requesting resources. Thus, by accessing entity metadata associated with the cryptographic token associated with the entity, validation subsystem 116 may further evaluate the reputation or trustworthiness of the entity and, as such, generate a reputability score based on this value. For example, reputability score may be calculated using an algorithm, natural language processing model or machine learning model that evaluates the entity metadata and generates a metric that allows for comparison with other requesting entities.

As referred to herein, a URI may include a sequence of characters that identifies a logical or physical resource. For example, a URI may be or include a URL, which allows for resources to be located. A URI may include or provide only a name, without a means of locating or retrieving the resource (i.e., a URN). In some embodiments, resource distribution system 102 may retrieve a resource locator, such as a URL, which may include any indication of a location or method of retrieving information or a resource. The URI, URN, URL or resource locator may enable resource distribution system 102 to retrieve entity metadata from an external source and, thus, validate the reputability of the entity. For example, a URI may include a URL link to a website, such as Charity Navigator, which allows charities to be evaluated and reviewed. As referred to herein, entity metadata may include any information or data related to the entity. For example, entity metadata may include reviews, ratings or financial information about a charity. By retrieving entity metadata, validation subsystem 116 may receive enough information to determine a reputability score for the entity requesting cryptographic resources and, as such, may mitigate the risk of distributing resources to an organization, for example, with poor reputability.

Figure 5:
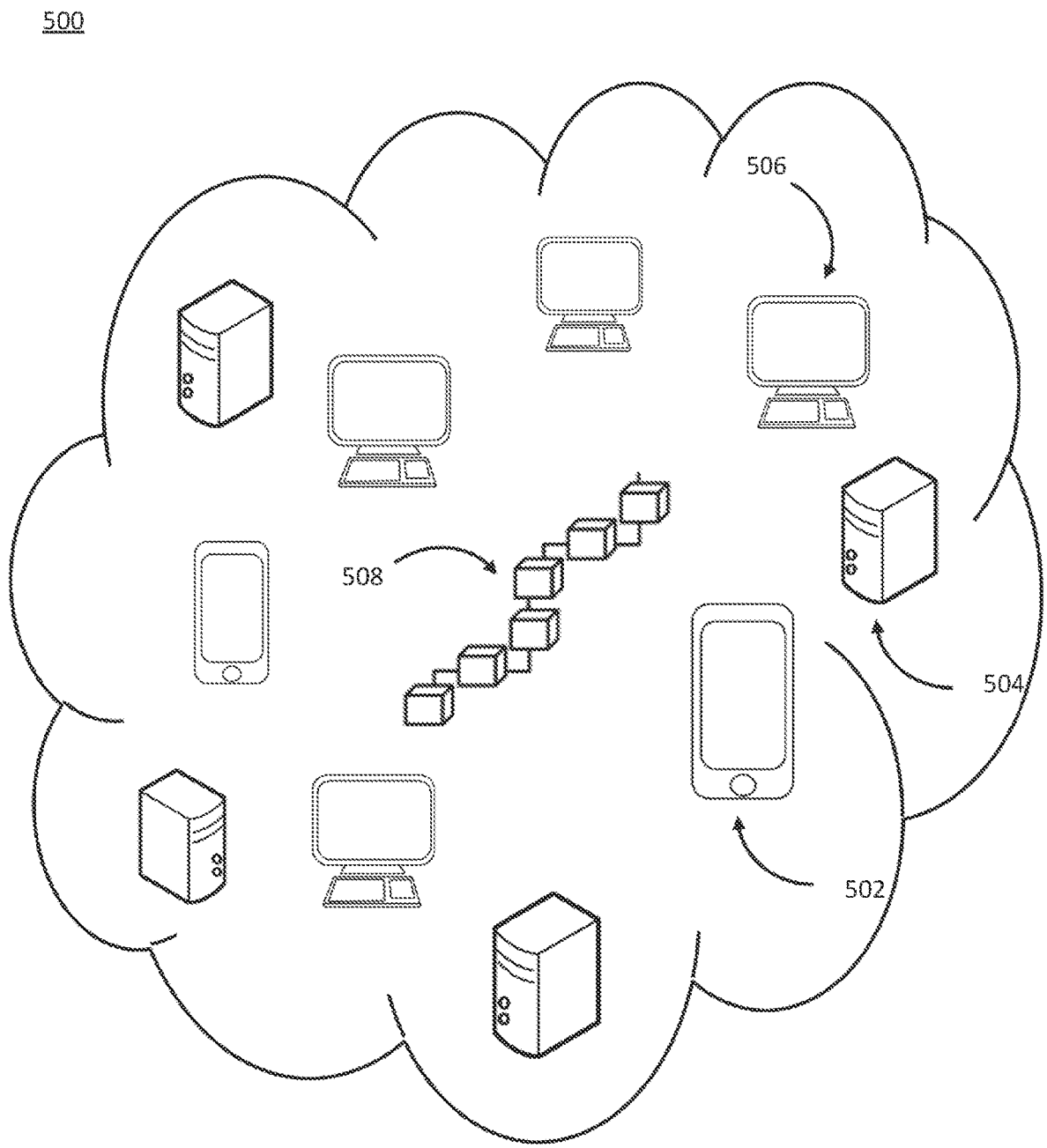
FIG. 5 shows an illustrative diagram for a decentralized environment for performing blockchain functions, in accordance with one or more embodiments.

FIG. 5 shows an illustrative diagram for a decentralized environment for performing blockchain functions, in accordance with one or more embodiments. For example, the diagram presents various components that may be used to allocate and distribute cryptographic resources in response to an off-chain trigger or event upon request, in some embodiments.

As shown in FIG. 5, system 500 may include multiple user devices (e.g., user device 502, user device 504, and/or user device 506). For example, system 500 may comprise a distributed state machine, in which each of the components in FIG. 5 acts as a client of system 500. For example, system 500 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 500 may interact with, and facilitate the function of, blockchain 508.

It should be noted that, while shown as a smartphone, a personal computer and a server in FIG. 5, the user devices may be any type of computing device, including, but not limited to, a laptop computer, a tablet computer, a hand-held computer, and/or other computing equipment (e.g., a server), including "smart," wireless, wearable and/or mobile devices. It should be noted that embodiments describing system 500 performing a blockchain function may equally be applied to, and correspond to, an individual user device (e.g., user device 502, user device 504 and/or user device 506) performing the blockchain function. That is, system 500 may correspond to the user devices (e.g., user device 502, user device 504 and/or user device 506), collectively or individually.

Each of the user devices may be used by the system to conduct blockchain functions or operations and/or contribute to allocating and distributing cryptographic resources in response to an off-chain trigger or event upon request. As referred to herein, "blockchain functions" may include any operations, including and/or related to blockchains and blockchain technology. For example, blockchain functions may include conducting transactions, querying a distributed ledger, generating additional blocks for a blockchain, transmitting communications-related non-fungible tokens, performing encryption/decryption, exchanging public/private keys and/or other operations related to blockchains and blockchain technology. In some embodiments, a blockchain function may comprise the creation, modification, detection and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange and/or review of a token (e.g., a digital blockchain-specific asset), including a non-fungible token. A non-fungible token may comprise a token that is associated with a good, a service, a smart contract, and/or other content that may be verified by, and stored using, blockchain technology.

In some embodiments, blockchain functions may also include actions related to mechanisms that facilitate other blockchain functions (e.g., actions related to metering activities for blockchain functions on a given blockchain network). For example, Ethereum, which is an open source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for enabling Turing-complete computation, while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 5, one or more user devices may include a digital wallet or a cryptowallet/cryptographic wallet (e.g., a digital wallet on user device 504) used to perform blockchain functions. For example, the digital wallet may comprise a repository that allows users to store, manage and trade their cryptocurrencies and assets, interact with blockchains, and/or conduct blockchain functions using one or more applications. A digital wallet may be a form of a cryptography-based storage application, as described above. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 5, one or more user devices may include a private key (e.g., a key included on user device 506) and/or digital signature. For example, system 500 may use cryptographic systems for conducting blockchain functions, such as distributing cryptographic resources in response to an off-chain trigger or event upon request. For example, system 500 may use public key cryptography, which features a pair of digital keys (e.g., which may comprise strings of data). In such cases, each pair comprises a public key (e.g., which may be public) and a private key (e.g., which may be kept private). System 500 may generate the key pairs using cryptographic algorithms (e.g., featuring one-way functions). System 500 may then encrypt a message (or other blockchain function) using an intended receiver's public key such that the encrypted message may be decrypted only with the receiver's corresponding private key. In some embodiments, system 500 may combine a message with a private key to create a digital signature on the message. For example, the digital signature may be used to verify the authenticity of blockchain functions. As an illustration, when conducting blockchain functions, system 500 may use the digital signature to prove to every node in the system that it is authorized to conduct the blockchain functions.

For example, system 500 may comprise a plurality of nodes for the blockchain network. Each node may correspond to a user device (e.g., user device 502). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain and/or ensuring that these additions are accurate. The nodes may continually record the state of the blockchain and respond to remote procedure requests for information about the blockchain.

For example, user device 502 may request a blockchain function (e.g., conduct a transaction). The blockchain function may be authenticated by user device 504 and/or another node (e.g., a user device in the community network of system 500). For example, using cryptographic keys, system 500 may identify users and give access to their respective user accounts (e.g., corresponding digital wallets) within system 500. Using private keys (e.g., known only to the respective users) and public keys (e.g., known to the community network), system 500 may create digital signatures to authenticate the users.

Following an authentication of the blockchain function, the blockchain function may be authorized. For example, after the blockchain function is authenticated between the users, system 500 may authorize the blockchain function prior to adding it to the blockchain. System 500 may add the blockchain function to blockchain 508. System 500 may perform this based on a consensus of the user devices within system 500. For example, system 500 may rely on a majority (or other metric) of the nodes in the community network (e.g., user device 502, user device 504 and/or user device 506) to determine that the blockchain function is valid. In response to validation of the block, a node user device (e.g., user device 502, user device 504 and/or user device 506) in the community network (e.g., a miner) may receive a reward (e.g., in a given cryptocurrency) as an incentive for validating the block.

To validate the blockchain function, system 500 may use one or more validation protocols and/or validation (or consensus) mechanisms. For example, system 500 may use a proof-of-work (POW) mechanism in which a user device must provide evidence that it performed computational work to validate a blockchain function and thus, this mechanism provides a manner for achieving consensus in a decentralized manner, as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 500 may use a proof-of-stake (POS) mechanism in which a user account (e.g., corresponding to a node on the blockchain network) is required to have, or "stake," a predetermined amount of tokens in order for system 500 to recognize it as a validator in the blockchain network.

In response to validation of the block, the block is added to blockchain 508, and the blockchain function is completed. For example, to add the blockchain function to blockchain 508, the successful node (e.g., the successful miner) encapsulates the blockchain function in a new block before transmitting the block throughout system 500.

FIG. 6 shows illustrative components for a system used to distribute on-chain cryptographic resources based on conditions generated responsive to an off-chain trigger, in accordance with one or more embodiments. For example, FIG. 6 may show illustrative components for distributing cryptographic resources between donors that have contributed resources to a smart contract for distribution to charitable entities, such as non-profit organizations, upon a triggering event, such as a natural disaster or a humanitarian emergency. As shown in FIG. 6, system 600 may include mobile device 622 and user terminal 624. While shown as a smartphone and personal computer, respectively, in FIG. 6, it should be noted that mobile device 622 and user terminal 624 may be any computing device, including, but not limited to, a laptop computer, a tablet computer, a hand-held computer and other computer equipment (e.g., a server), including "smart," wireless, wearable and/or mobile devices. FIG. 6 also includes cloud components 610. Cloud components 610 may alternatively be any computing device as described above, and may include any type of mobile terminal, fixed terminal or other device. For example, cloud components 610 may be implemented as a cloud computing system and may feature one or more component devices. It should also be noted that system 600 is not limited to three devices. Cloud components 610 may include one or more blockchain nodes, as well as resource distribution system 102. For example, one or more of cloud components 610 may interface with on-chain programs 108a-108n connected to network 150, and may access blockchain 608. Additionally, or alternatively, cloud components 610 may interface with validation systems 106a-106n through network 150. For example, resource distribution system 102 within cloud components 610 may communicate with validation systems 106a-106n on mobile device 622 or user terminal 624. Users may, for instance, utilize one or more devices to interact with one another, one or more servers or other components of system 600. It should be noted that while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by components of cloud components 610. In some embodiments, the various computers and systems described herein may include one or more computing devices that are programmed to perform the described functions. Additionally, or alternatively, multiple users may interact with system 600 and/or one or more components of system 600. For example, in one embodiment, a first user and a second user may interact with system 600 using two different components.

With respect to the components of mobile device 622, user terminal 624 and cloud components 610, each of these devices may receive content and data via input/output (I/O) paths. Each of these devices may also include processors and/or control circuitry to send and receive commands, requests and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and user terminal 624 include a display upon which to display data (e.g., conversational response, queries, and/or notifications).

Additionally, as mobile device 622 and user terminal 624 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 600 may run an application (or another suitable program). The application may cause the processors and/or control circuitry to perform operations related to generating dynamic conversational replies, queries and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630 and 632. Communication paths 628, 630 and 632 may include the Internet, a mobile phone network, a mobile voice or data network (e.g., a 5G or long term evolution (LTE) network), a cable network, a public switched telephone network or other types of communications networks or combinations of communications networks. Communication paths 628, 630 and 632 may separately or together include one or more communications paths, such as a satellite path, a fiber-optic path, a cable path, a path that supports Internet communications (e.g., IPTV), free-space connections (e.g., for broadcast or other wireless signals) or any other suitable wired or wireless communications path or combination of such paths. The computing devices may include additional communication paths linking a plurality of hardware, software and/or firmware components operating together. For example, the computing devices may be implemented by a cloud of computing platforms operating together as the computing devices.

Cloud components 610 may include communication subsystem 112, rule matching subsystem 118, data extraction subsystem 114 or validation subsystem 116. Cloud components 610 may include data structures, such as transfer request 202 or lists of contributor identifiers and condition sets (e.g., data structure 302), and may include information such as cryptographic signature 204, cryptographic token identifier 206, resource allocation request 208, contributor identifiers 304, and/or condition sets 306. Alternatively, or additionally, information may be stored or retrieved through communication paths.

Cloud components 610 may access blockchain 608 (e.g., which in some embodiments may correspond to on-chain programs 108*a*-108*n* (FIG. 1)). Additionally, or alternatively, cloud components 610 may access data node 104, network 150, validation systems 106*a*-106*n*, as well as on-chain programs 108*a*-108*n*.

Cloud components 610 may include model 602, which may be a machine learning model, artificial intelligence model, deep learning model, etc. (which may be referred to collectively herein as "models"). Model 602 may take inputs 604 and provide outputs 606. The inputs may include multiple datasets, such as a training dataset and a test dataset. Each of the plurality of datasets (e.g., inputs 604) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., determining how to allocate resources upon a transfer request from a requesting entity).

In a variety of embodiments, model 602 may update its configurations (e.g., weights, biases or other parameters) based on the assessment of its prediction (e.g., outputs 606) and reference feedback information (e.g., user indication of accuracy, reference labels, or other information). In a variety of embodiments, where model 602 is a neural network, connection weights may be adjusted to reconcile differences between the neural network's prediction and reference feedback.

In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation and inhibition for model 602 may be more free-flowing, with connections interacting in a more chaotic and complex fashion. During testing, an output layer of model 602 may indicate whether or not a given input corresponds to a classification of model 602 (e.g., whether or not to distribute resources to another entity).

In some embodiments, the model (e.g., model 602) may automatically perform actions based on outputs 606. In some embodiments, the model (e.g., model 602) may not perform any actions. The output of the model (e.g., model 602) may be used to determine whose or how many cryptographic resources to distribute in response to a resource allocation request, for example.

System 600 also includes API layer 650. API layer 650 may allow the system to generate summaries across different devices. In some embodiments, API layer 650 may be implemented on mobile device 622 or user terminal 624. Alternatively, or additionally, API layer 650 may reside on one or more of cloud components 610. API layer 650 (which may be a REST or web services API layer) may provide a decoupled interface to data and/or functionality of one or more applications. API layer 650 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, PUP and JavaScript. Simple Object Access Protocol (SOAP) web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful web services, using resources like Service Repository and Developer Portal, but with low governance, standardization and separation of concerns. Alternatively, system 600 may be fully based on API layer 650, such that separation of concerns between layers like API layer 650, services and applications are in place.

In some embodiments, the system architecture may use a microservice approach. Such systems may use two types of layers: Front-End Layer and Back-End Layer, where microservices reside. In this kind of architecture, the role of the API layer 650 may provide integration between Front-End and Back-End. In such cases, API layer 650 may use RESTful APIs (exposition to front-end or even communication between microservices). API layer 650 may use Advanced Message Queuing Protocol (AMQP) (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open source API platforms and their modules. API layer 650 may use a developer portal. API layer 650 may use strong security constraints applying web application firewall (WAF) and distributed denial of service (DDoS) protection, and API layer 650 may use RESTful APIs as standard for external integration.

Figure 7:
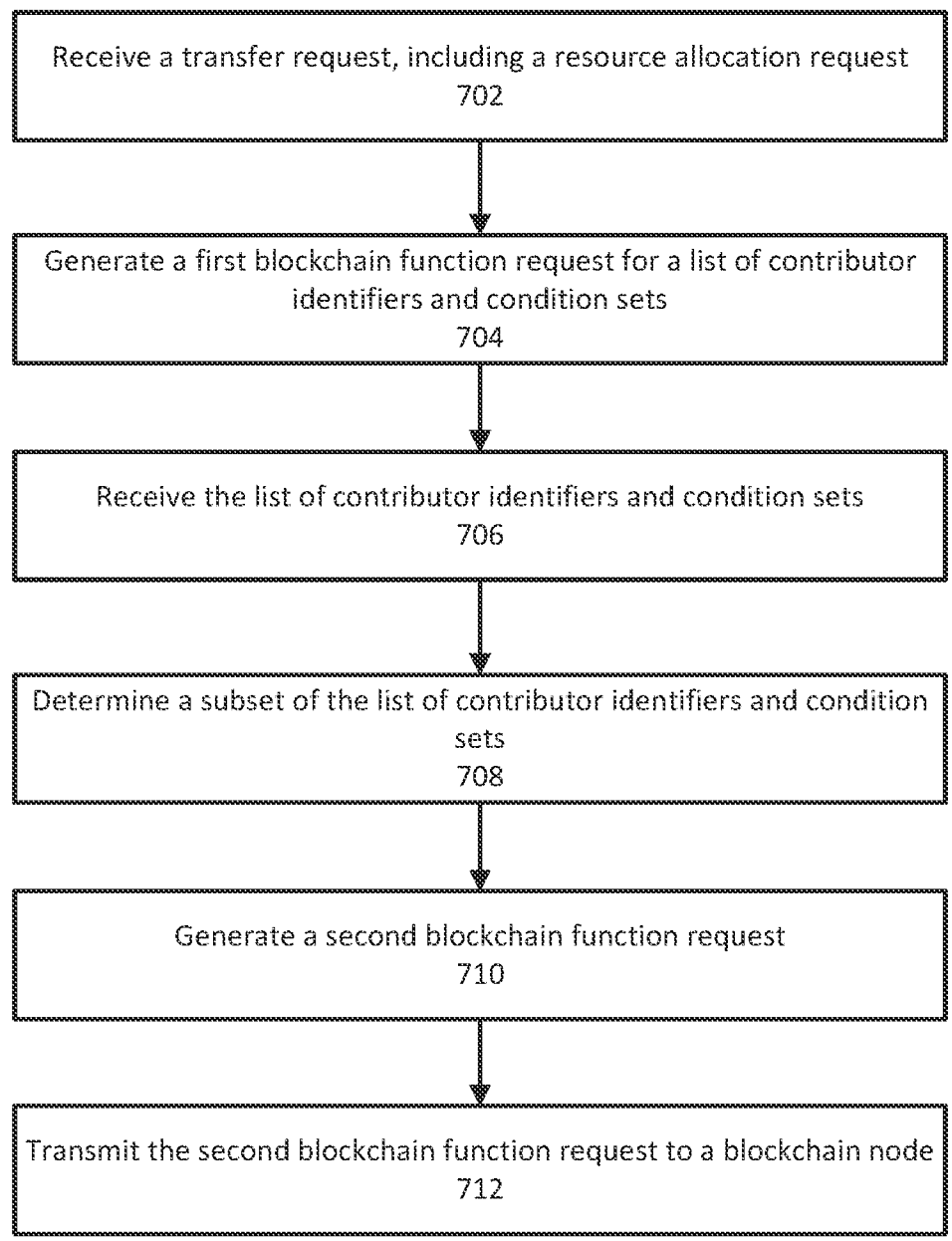
FIG. 7 shows an illustrative flowchart of operations for a system for distributing on-chain cryptographic resources responsive to an off-chain trigger, in accordance with one or more embodiments.

FIG. 7 shows a flowchart of operations for allocating cryptographic resources in response to an off-chain trigger or event, in accordance with one or more embodiments. For example, the system may use process 700 (e.g., as implemented on one or more components described above) to distribute cryptographic resources to an entity requesting resources via a blockchain function request to a smart contract.

At 702, resource distribution system 102 (e.g., using one or more components described above) may receive a transfer request, including a resource allocation request. That is, resource distribution system 102 may utilize communication subsystem 112 to receive from a device (e.g., mobile device 622 or user terminal 624, through communication paths 628 or 630) associated with an entity, at one or more cloud components 610, a transfer request. The transfer request may include a resource allocation request. Resource distribution system 102 may store the transfer request and resource allocation request as data, for example, within a database in data node 104.

In some embodiments, data extraction subsystem 114 may extract trigger classifications and trigger dates from the resource allocation request, or cryptographic token identifiers or digital signatures from the transfer request. In some embodiments, validation subsystem 116 may retrieve entity metadata using a resource locator associated with the cryptographic token identifier and, based on this entity metadata, determine a reputability score for the requesting entity. In some embodiments, validation subsystem 116 may validate whether an event occurred or not (i.e., validate the resource allocation request) by extracting trigger classifications and matching these with information from a validator node. By doing so, resource distribution system 102 may ensure possession of information needed to evaluate and allocate cryptographic resources that may be stored within an on-chain program for distributing such resources from contributors.

At 704, resource distribution system 102 (e.g., using one or more components described above) may generate a first blockchain function request for a list of contributor identifiers and condition sets. For example, utilizing communication subsystem 112 and through cloud components 610, resource distribution system 102 may create and store a request in data node 104 for contributors to a smart contract at, for example, on-chain programs 108a-108n. For example, communication subsystem 112 may communicate, to blockchain 608 (e.g., as represented in FIG. 5 as blockchain 508) a request pertaining to the contributors of cryptographic resources to a smart contract. Resource distribution system 102 may, in some embodiments, receive this blockchain function request from mobile device 622 or user terminal 624, and communicate this request to blockchain 608 within cloud components 610 through communication paths 628, 630, 632 or 650. Thus, resource distribution system 102 may receive information about contributors of cryptographic resources to the smart contract, in order to evaluate how to allocate resources efficiently in response to the resource allocation request of 702.

At 706, resource distribution system 102 (e.g., using one or more components described above) may receive the list of contributor identifiers and condition sets in response to the first blockchain function request, from the smart contract or on-chain programs 108a-108n, for example. Utilizing communication subsystem 112, through cloud components 610 (e.g., through user devices 502-506), resource distribution system 102 may receive the list of contributor identifiers and condition sets from a blockchain node (e.g., on blockchain 508 or 608). The list of contributor identifiers and condition sets may have data structure 302 as in FIG. 3, which may be stored on data node 104. Contributor identifiers may include information regarding rules for which contributors would desire distribution or donation of cryptographic resources and, as such, by receiving this information, validation subsystem 116 may receive information to aid in evaluating the entity's resource allocation request with respect to the available, contributed resources on the smart contract.

At 708, resource distribution system 102 (e.g., using one or more components described above) may determine a subset of the list of contributor identifiers and condition sets.

That is, validation subsystem 116 may determine, from the list of contributor identifiers and the condition sets, a subset of the list of contributor identifiers and a corresponding subset of the condition sets. Each condition set in the corresponding subset of the condition sets may match the resource allocation request. For example, resource distribution system 102, through rule matching subsystem 118, may extract a trigger classification and determine a subset of the condition sets that match the trigger classification, as well as determine contributor identifiers where these conditions are matched. This matching may be carried out, for example, through processors within any cloud components 610 (e.g., through user devices 502-506), mobile device 622, or user terminal 624. In some embodiments, a machine learning model, such as that in model 602, may take, as inputs 604, information related to the transfer request (e.g., the resource allocation request or information about the requesting entity, as well as the list of contributor identifiers and corresponding condition sets), and may return, as outputs 606, condition sets that match the resource allocation request. By doing so, resource distribution system 102 may ensure that only contributed resources that match the transfer request are given. In this manner, only contributions with condition sets that are consistent with the transfer request may be considered.

At 710, resource distribution system 102 (e.g., using one or more components described above) may generate a second blockchain function request. That is, communication subsystem 112 may generate a second blockchain function request, where the second blockchain function request may include at least a portion of the transfer request. For example, the second blockchain function request may include information regarding the entity requesting resources and, in some embodiments, may include the subset of the list of contributor identifiers and condition sets that have been determined to match the transfer request. The second blockchain function may be communicated, for example, through communication paths 628, 630, 632 and/or 650, to a blockchain node that interfaces with blockchain 608 through cloud components 610. Devices that may generate the request may include user devices 502-506, for example, and the request may be stored within data node 104. Information related to the transfer request that is included in the second blockchain function request may include validation information, such as whether a digital signature was able to be verified, or whether the token identifier of the transfer request matched the owner identifier. By including information about the transfer request as a blockchain function request, and sending this information to an on-chain program (e.g., a smart contract), the smart contract may receive information (such as which contributors and corresponding condition sets match the transfer request) in order to allocate resources and distribute these, responsive to the transfer request. As such, resource distribution system 102 may enable an on-chain program to link contributors or donors to entities requesting resources, for example, in response to natural disasters, humanitarian emergencies or other charitable causes.

At 712, resource distribution system 102 (e.g., using one or more components described above) may transmit the second blockchain function request to a blockchain node, for example, one that interfaces with blockchain 608. For example, through communication subsystem 112, resource distribution system 102 may transmit the blockchain function request of 710, through cloud components 610 (e.g., through one or more of user devices 502-506) to blockchain 508, where the blockchain request may include portions of the transfer request, as in the data structure for transfer request 202, as well as information regarding validation of the requested entity, as well as condition sets that match the transfer request. By communicating the second blockchain function to the smart contract, resource distribution system 102 enables the smart contract to execute any distribution of resources warranted by the trigger or event, where the event and/or requester may have been validated through external means. Thus, the smart contract may receive enough information to determine how to allocate contributed resources in a manner that is efficient and compliant with contributors' conditions.

It is contemplated that the operations or descriptions of FIG. 7 may be used with any other embodiment of this disclosure. In addition, the operations and descriptions described in relation to FIG. 7 may be done in alternative orders or in parallel to further the purposes of this disclosure. For example, each of these operations may be performed in any order, in parallel or simultaneously to reduce lag or increase the speed of the system or method. Furthermore, it should be noted that any of the components, devices or equipment discussed in relation to the figures above could be used to perform one or more of the operations in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for migrating access tokens that are used for validating network operations between user accounts will be better understood with reference to the following enumerated embodiments:

1. A method for handling on-chain cryptographic resources based on conditions generated responsive to an off-chain trigger, the method comprising: receiving, from a device associated with an entity, a transfer request, wherein the transfer request comprises a resource allocation request; generating a first blockchain function request for a list of contributor identifiers and condition sets; receiving, in response to the first blockchain function request, the list of contributor identifiers and the condition sets; determining, from the list of contributor identifiers and the condition sets, a subset of the list of contributor identifiers and a corresponding subset of the condition sets, wherein each condition set in the corresponding subset of the condition sets matches the resource allocation request; generating a second blockchain function request, wherein the second blockchain function request comprises at least a portion of the transfer request; and transmitting the second blockchain function request to a blockchain node.

2. The method of the previous embodiment, further comprising: extracting, from the resource allocation request (1) a trigger classification, and (2) a trigger date; transmitting, to a validator node, a trigger validation request comprising the trigger classification and the trigger date; and in response to receiving, from the validator node, a validation message that matches the trigger validation request, verifying the resource allocation request.

3. The method of any of the preceding embodiments, further comprising: transmitting, to an on-chain program, the first blockchain function request for the list of contributor identifiers and the condition sets; and in response to transmitting the first blockchain function request, receiving, from the on-chain program, the list of contributor identifiers and the condition sets.

4. The method of any of the preceding embodiments, further comprising: extracting, from a cryptographic token corresponding to a cryptographic token identifier included in the resource allocation request, an owner identifier, wherein the owner identifier indicates an identifier of a cryptography-based storage application that controls the cryptographic token; determining that a cryptography-based storage application address received with the resource allocation request matches the owner identifier; determining, based on decrypting a digital signature included in the transfer request using a public key associated with the entity, that the cryptography-based storage application that controls the cryptographic token corresponds to the resource allocation request; and in response to determining that (1) the cryptography-based storage application address received with the resource allocation request matches the owner identifier, and (2) the cryptography-based storage application that controls the cryptographic token corresponds to the resource allocation request, determining that the transfer request is valid.

5. The method of any of the preceding embodiments, wherein determining, from the list of contributor identifiers and the condition sets, the subset of the list of contributor identifiers and the corresponding subset of the condition sets comprises: extracting, from the resource allocation request, a trigger classification; determining the subset of the condition sets, wherein each condition set in the subset of the condition sets includes a trigger condition matching the trigger classification; and determining the subset of the list of contributor identifiers that correspond to the subset of the condition sets.

6. The method of any of the preceding embodiments, wherein generating the second blockchain function request comprises: extracting, from the resource allocation request, an indication of cryptographic resources requested by the transfer request and an address of a cryptography-based storage application to be assigned to control the cryptographic resources; and generating, within the second blockchain function request, a command to transfer the indication of cryptographic resources to the address of the cryptography-based storage application according to the subset of the list of contributor identifiers and the corresponding subset of the condition sets.

7. The method of any of the preceding embodiments, further comprising: determining a reputability score of the entity; and based on the reputability score being below a threshold, generating the second blockchain function request to not include any contributors.

8. The method of any of the preceding embodiments, wherein determining the reputability score of the entity further comprises: extracting, from the transfer request, a cryptographic token identifier with the entity; determining, using the cryptographic token identifier, a URI corresponding to a cryptographic token associated with the cryptographic token identifier; retrieving entity metadata using a resource locator associated with the URI; and based on the entity metadata, determining the reputability score for the entity.

9. A tangible, non-transitory, machine-readable medium storing instructions that, when executed by a data processing apparatus, cause the data processing apparatus to perform operations comprising those of any of embodiments 1-8.

10. A system comprising one or more processors and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for handling on-chain cryptographic resources based on conditions generated responsive to an off-chain trigger, the system comprising:
  memory; and
  one or more processors, coupled to the memory, configured to cause the system to:
    receive a transfer request for transferring control of cryptographic resources, wherein the transfer request comprises (1) a digital signature generated using a private key associated with an entity, (2) a cryptographic token identifier that identifies a cryptographic token representing the entity, and (3) a resource allocation request;
    validate the transfer request using the digital signature and the cryptographic token identifier;
    generate a first blockchain function request, to be executed by an on-chain program, requesting a list of contributor identifiers and condition sets, wherein each condition set is associated with a contributor identifier that identifies a user who has given control of cryptographic resources assigned for distribution to the on-chain program, and wherein the condition sets correspond to conditions for distributing the cryptographic resources through the on-chain program in response to one or more triggers;
    receive, in response to the first blockchain function request, the list of contributor identifiers and the condition sets;
    determine, from the list of contributor identifiers and the condition sets, a subset of the list of contributor identifiers and a corresponding subset of the condition sets, wherein each condition set in the corresponding subset of the condition sets matches the resource allocation request;
    generate a second blockchain function request to transfer, using the on-chain program, cryptographic resources to be controlled by a cryptography-based storage application associated with the entity, wherein the second blockchain function request comprises at least a portion of the transfer request; and
    transmit the second blockchain function request to a blockchain node of a blockchain.

2. The system of claim 1, wherein the one or more processors further cause the system to:
  extract, from the resource allocation request (1) a trigger classification, and (2) a trigger date, wherein the trigger classification indicates a type of event;

transmit a trigger validation request comprising the trigger classification and the trigger date; and
determine, based on receiving a validation message that matches the trigger validation request, the resource allocation request is valid.

3. The system of claim 1, wherein the one or more processors further cause the system to:
extract, from the cryptographic token corresponding to the cryptographic token identifier, an owner identifier, wherein the owner identifier indicates an identifier of the cryptography-based storage application that controls the cryptographic token;
determine that a cryptography-based storage application address received with the resource allocation request matches the owner identifier;
determine, based on decrypting the digital signature using a public key associated with the entity, that the cryptography-based storage application that controls the cryptographic token corresponds to the resource allocation request; and
in response to determining that (1) the cryptography-based storage application address received with the resource allocation request matches the owner identifier, and (2) the cryptography-based storage application that controls the cryptographic token corresponds to the resource allocation request, determine that the transfer request is valid.

4. The system of claim 1, wherein, when determining, from the list of contributor identifiers and the condition sets, the subset of the list of contributor identifiers and the corresponding subset of the condition sets, the one or more processors are configured to cause the system to:
extract, from the resource allocation request, a trigger classification;
determine the subset of the condition sets, wherein each condition set in the subset of the condition sets includes a trigger condition matching the trigger classification; and
determine the subset of the list of contributor identifiers that correspond to the subset of the condition sets.

5. A method for handling on-chain cryptographic resources based on conditions generated responsive to an off-chain trigger, the method comprising:
receiving, from a device associated with an entity, a transfer request, wherein the transfer request comprises a resource allocation request;
extracting, from the resource allocation request, a trigger classification and a trigger date;
transmitting, to a validator node, a trigger validation request comprising the trigger classification and the trigger date; and
receiving, from the validator node, a validation message that matches the trigger validation request;
verifying the resource allocation request based on receiving the validation message;
generating a first blockchain function request for a list of contributor identifiers and condition sets;
receiving, in response to the first blockchain function request, the list of contributor identifiers and the condition sets;
determining, from the list of contributor identifiers and the condition sets, a subset of the list of contributor identifiers and a corresponding subset of the condition sets, wherein each condition set in the corresponding subset of the condition sets matches the resource allocation request;
generating a second blockchain function request, wherein the second blockchain function request comprises at least a portion of the transfer request; and
transmitting the second blockchain function request to a blockchain node, wherein the second blockchain function request includes the subset of the list of contributor identifiers and the corresponding subset of the condition sets that match the resource allocation request.

6. The method of claim 5, further comprising:
transmitting, to an on-chain program, the first blockchain function request for the list of contributor identifiers and the condition sets; and
in response to transmitting the first blockchain function request, receiving, from the on-chain program, the list of contributor identifiers and the condition sets.

7. The method of claim 5, further comprising:
extracting, from a cryptographic token corresponding to a cryptographic token identifier included in the resource allocation request, an owner identifier, wherein the owner identifier indicates an identifier of a cryptography-based storage application that controls the cryptographic token;
determining that a cryptography-based storage application address received with the resource allocation request matches the owner identifier;
determining, based on decrypting a digital signature included in the transfer request using a public key associated with the entity, that the cryptography-based storage application that controls the cryptographic token corresponds to the resource allocation request; and
in response to determining that (1) the cryptography-based storage application address received with the resource allocation request matches the owner identifier, and (2) the cryptography-based storage application that controls the cryptographic token corresponds to the resource allocation request, determining that the transfer request is valid.

8. The method of claim 5, wherein determining, from the list of contributor identifiers and the condition sets, the subset of the list of contributor identifiers and the corresponding subset of the condition sets comprises:
determining the subset of the condition sets, wherein each condition set in the subset of the condition sets includes a trigger condition matching the trigger classification; and
determining the subset of the list of contributor identifiers that correspond to the subset of the condition sets.

9. The method of claim 5, wherein generating the second blockchain function request comprises:
extracting, from the resource allocation request, an indication of cryptographic resources requested by the transfer request and an address of a cryptography-based storage application to be assigned to control the cryptographic resources; and
generating, within the second blockchain function request, a command to transfer the indication of cryptographic resources to the address of the cryptography-based storage application according to the subset of the list of contributor identifiers and the corresponding subset of the condition sets.

10. The method of claim 5, further comprising:
determining a reputability score of the entity; and
based on the reputability score being below a threshold, generating the second blockchain function request to not include any contributors.

11. The method of claim 10, wherein determining the reputability score of the entity further comprises:
   extracting, from the transfer request, a cryptographic token identifier associated with the entity;
   determining, using the cryptographic token identifier, a uniform resource identifier (URI) corresponding to a cryptographic token associated with the cryptographic token identifier;
   retrieving entity metadata using a resource locator associated with the URI; and
   based on the entity metadata, determining the reputability score for the entity.

12. The method of claim 5,
   wherein the transfer request further comprises a digital signature generated using a private key associated with the entity, and
   wherein the method further comprises:
      validating the transfer request using the digital signature.

13. The method of claim 5, wherein the first blockchain function request is configured to be executed by an on-chain program.

14. One or more non-transitory, computer-readable media storing instructions that, when executed by one or more processors, cause the one or more processors to perform operations comprising:
   receiving, from a device associated with an entity, a transfer request, wherein the transfer request comprises a resource allocation request;
   generating a first blockchain function request for a list of contributor identifiers and condition sets;
   receiving, in response to the first blockchain function request, the list of contributor identifiers and the condition sets;
   extracting, from the resource allocation request, a trigger classification;
   determining, from the condition sets, a subset of the condition sets, wherein each condition set in the subset of the condition sets includes a trigger condition matching the trigger classification;
   determining, from the list of contributor identifiers, a subset of the list of contributor identifiers that correspond to the subset of the condition sets, wherein each condition set in the subset of the condition sets matches the resource allocation request;
   generating a second blockchain function request, wherein the second blockchain function request comprises at least a portion of the transfer request; and
   transmitting the second blockchain function request to a blockchain node, wherein the second blockchain function request includes the subset of the list of contributor identifiers and the corresponding subset of the condition sets that match the resource allocation request.

15. The one or more non-transitory, computer-readable media of claim 14, wherein the instructions further cause the one or more processors to perform operations comprising:
   extracting, from the resource allocation request, and a trigger date;
   transmitting, to a validator node, a trigger validation request comprising the trigger classification and the trigger date; and
   in response to receiving, from the validator node, a validation message that matches the trigger validation request, verifying the resource allocation request.

16. The one or more non-transitory, computer-readable media of claim 14, wherein the instructions further cause the one or more processors to perform operations comprising:
   transmitting, to an on-chain program, the first blockchain function request for the list of contributor identifiers and the condition sets; and
   receiving, from the on-chain program, the list of contributor identifiers and the condition sets.

17. The one or more non-transitory, computer-readable media of claim 14, wherein the instructions further cause the one or more processors to perform operations comprising:
   extracting, from a cryptographic token corresponding to a cryptographic token identifier included in the resource allocation request, an owner identifier, wherein the owner identifier indicates an identifier of a cryptography-based storage application that controls the cryptographic token;
   determining that a cryptography-based storage application address received with the resource allocation request matches the owner identifier;
   determining, based on decrypting a digital signature included in the transfer request using a public key associated with the entity, that the cryptography-based storage application that controls the cryptographic token corresponds to the resource allocation request; and
   in response to determining that (1) the cryptography-based storage application address received with the resource allocation request matches the owner identifier, and (2) the cryptography-based storage application that controls the cryptographic token corresponds to the resource allocation request, determining that the transfer request is valid.

18. The one or more non-transitory, computer-readable media of claim 14, wherein the instructions for generating the second blockchain function request cause the one or more processors to perform operations comprising:
   extracting, from the resource allocation request, an indication of cryptographic resources requested by the transfer request and an address of a cryptography-based storage application to be assigned to control the cryptographic resources; and
   generating, within the second blockchain function request, a command to transfer the indication of cryptographic resources to the address of the cryptography-based storage application according to the subset of the list of contributor identifiers and the corresponding subset of the condition sets.

19. The one or more non-transitory, computer-readable media of claim 14, wherein the instructions further cause the one or more processors to perform operations comprising:
   determining a reputability score of the entity; and
   based on the reputability score being below a threshold, generating the second blockchain function request to not include any contributors.

20. The one or more non-transitory, computer-readable media of claim 19, wherein the instructions for determining the reputability score of the entity cause the one or more processors to perform operations comprising:
   extracting, from the transfer request, a cryptographic token identifier with the entity;
   determining, using the cryptographic token identifier, a URI corresponding to a cryptographic token associated with the cryptographic token identifier;
   retrieving entity metadata using a resource locator associated with the URI; and
   based on the entity metadata, determining the reputability score for the entity.

* * * * *